United States Patent [19]
Kare et al.

[11] Patent Number: 5,541,656
[45] Date of Patent: Jul. 30, 1996

[54] DIGITAL CAMERA WITH SEPARATE FUNCTION AND OPTION ICONS AND CONTROL SWITCHES

[75] Inventors: Susan D. Kare, San Francisco; Mark T. Lavelle, San Mateo; Paul C. Laughton, San Jose; Paul S. Montgomery; Herbert H. F. Pfeifer, both of San Francisco, all of Calif.

[73] Assignee: Logitech, Inc., Fremont, Calif.

[21] Appl. No.: 283,139

[22] Filed: Jul. 29, 1994

[51] Int. Cl.⁶ .................................................. H04N 5/225
[52] U.S. Cl. .......................... 348/334; 348/552; 354/219
[58] Field of Search ................................. 348/333, 334, 348/552, 372; 354/219; 358/906

[56] References Cited

U.S. PATENT DOCUMENTS

| | | | |
|---|---|---|---|
| 4,286,849 | 9/1981 | Uchidoi et al. | 354/23 |
| 4,326,784 | 4/1982 | Ichiyanagi | 354/53 |
| 4,461,560 | 7/1984 | Yoshino et al. | 354/475 |
| 4,618,238 | 10/1986 | Maitani et al. | 354/431 |
| 4,692,008 | 9/1987 | Arakawa et al. | 354/217 |
| 4,692,014 | 9/1987 | Kiuchi | 354/471 |
| 4,751,546 | 6/1988 | Yamamoto et al. | 354/468 |
| 4,888,610 | 12/1989 | Tsujimoto et al. | 354/475 |
| 4,958,184 | 9/1990 | Izumi et al. | 354/474 |
| 4,959,679 | 9/1990 | Yamamoto et al. | 354/419 |
| 5,111,299 | 5/1992 | Aoki et al. | 348/334 |
| 5,138,459 | 8/1992 | Roberts et al. | 358/209 |
| 5,148,202 | 8/1992 | Yoshida | 354/474 |
| 5,170,206 | 12/1992 | Yamamoto et al. | 354/474 |
| 5,191,373 | 3/1993 | Nakano | 354/474 |
| 5,202,961 | 4/1993 | Mills et al. | 395/159 |
| 5,206,732 | 4/1993 | Hudson | 348/211 X |
| 5,212,556 | 5/1993 | Ogawa | 348/334 X |
| 5,227,831 | 7/1993 | Miyazaki et al. | 354/402 |
| 5,231,501 | 7/1993 | Sakai | 348/552 X |
| 5,237,648 | 8/1993 | Mills et al. | 395/133 |

*Primary Examiner*—Wendy Greening
*Attorney, Agent, or Firm*—Townsend and Townsend and Crew LLP

[57] ABSTRACT

A hand-held digital camera including a CCD for receiving an image and converting the image to a digital file of image data, a memory for storing the image data, a communication port for communicating between the hand-held digital camera and a digital computer, and a user interface for receiving input commands from the user. The user interface includes a LCD and a plurality of switches for permitting the user to communicate with the camera intuitively. A host interface facilitates the transfer of commands and data between the digital camera and the host computer via a communication link and permits a user to operate the digital camera remotely from the host computer. The LCD includes function icons which the user can cycle among using one of the switches. The LCD also includes option icons for certain of the function icons, which the user can cycle among using a second switch.

24 Claims, 11 Drawing Sheets

5,541,656

DIGITAL CAMERA WITH SEPARATE FUNCTION AND OPTION ICONS AND CONTROL SWITCHES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Hand-held cameras utilizing chemical processes for recording images are well known in the art. Typically, the chemical process involves exposing a film of photosensitive chemicals to light to permanently record the image on film. Subsequent chemical processes transfer the image recorded on photosensitive film to photographic paper for presentation.

Because prior art cameras are based on chemical processes, it is inconvenient to convert the images stored on photosensitive film to digital data for use in digital computers. While it is possible to convert the photographs produced by prior art cameras and chemical processes to digital files using an appropriate scanner and software, the process is cumbersome and time consuming. Further, chemical-based processes involve permanent changes in the chemical structure of the photosensitive film. It is not possible, for example, to "undo" and delete an image taken with a chemical-based camera. In contrast, a digital camera storing images as digital data in memory can, responsive to a user command, selectively remove from its memory the unwanted images. Because the images are stored as digital data, the data representing the images can be transferred to a digital computer for subsequent manipulation and use without the need for further conversion.

What is desired is a hand-held digital camera which is capable of recording images electronically as digital data in its on-board memory. The camera preferably has a simple-to-use user interface, permitting a user to utilize the many options available intuitively. The camera further preferably includes a host communication interface, facilitating the transfer of commands and data between the digital camera and the host computer. To maximize flexibility, the digital camera preferably utilizes existing aftermarket camera accessories designed for the video camera and chemical-based camera markets.

SUMMARY OF THE INVENTION

The digital camera of the present invention is a stand-alone electronic camera that takes pictures in a similar manner to a conventional point-and-shoot chemical-based camera, except that the digital camera captures and stores the pictures electronically. To retrieve and use the pictures, the camera is connected to a digital computer (the host), e.g., a Macintosh, a PC-type computer, or a workstation, via an appropriate communication interface and software. Software within the host computer accesses the data stored for displaying the captured image on a display, merging the image into a document, storing, or printing on a suitable printer.

The digital camera of the present invention is designed to be as simple to use as a conventional point-and-shoot camera. In most cases, the user only has to turn the camera on, frame the subject in the viewfinder, and push the shutter button. Electronics within the camera performs image capture via a CCD array, image compression via an appropriate digital signal processing (DSP) circuit, and stores the resultant digital data in onboard memory.

In one embodiment, the hand-held digital camera includes a CCD for receiving an image and converting the image received to a digital file of image data. The camera includes a memory for storing the image data file and a communication port for communicating between the hand-held digital camera and a digital computer. There is a user interface which includes an LCD having a plurality of selectable function icons representing a plurality of selectable functions, at least one of the selectable function icons having selectable options. The camera further includes a first switch for cycling among the selectable function icons to chose a selected function, a second switch for cycling in a first direction among the selectable options of the selected function, and a third switch for cycling in a second direction among the selectable options of the selected function;

In another embodiment, the hand-held digital camera further includes an orifice having first screw threads for receiving a first detachable lens assembly, which first detachable lens assembly having second screw threads defining a 37 mm screw for mating with the first screw threads.

In yet another embodiment, the camera includes circuitry and host software cooperating with the communication port and responsive to a command from the digital computer for disabling a first one of the selectable functions, thereby preventing its selection by a user.

In another embodiment, the hand-held digital camera includes circuitry and software coupled to the communication port and responsive to a command from the digital computer for setting the power-up defaults of certain ones of the selectable functions. The selectable functions may be one of exposure offset, shutter delay, or flash functions.

In another embodiment, the host software and circuitry coupled to the communication port permit the hand-held digital camera, responsive to a command from the digital computer, to select one of the selectable functions and one of the selectable options without requiring a user to operate the camera switches.

DESCRIPTION OF THE PREFERRED EMBODIMENT

Figure 9A:
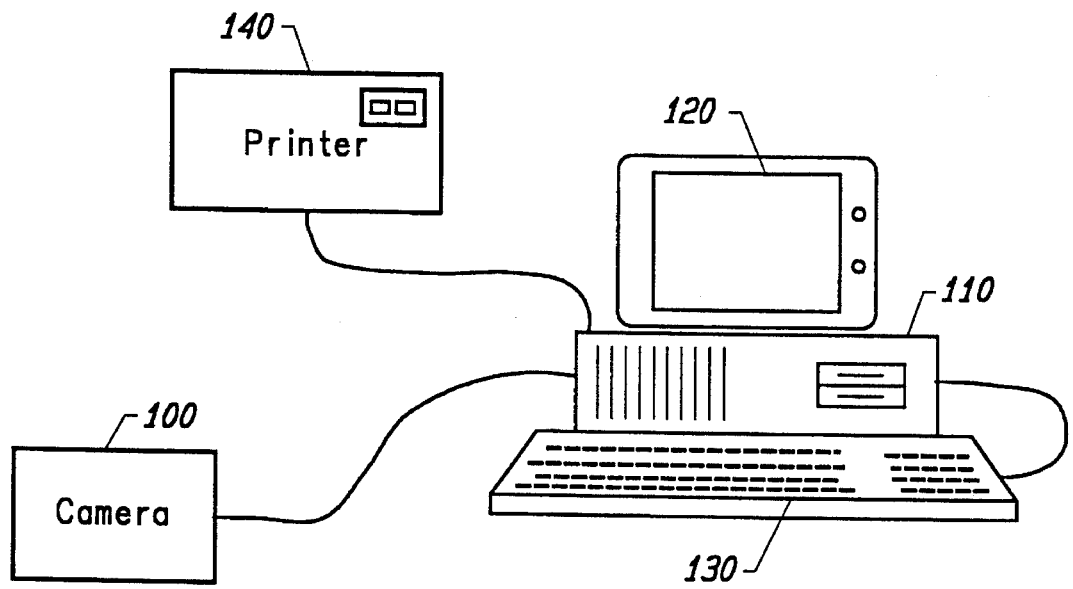
FIG. 9A shows the digital camera coupling to a host computer via communication link.

FIG. 9A is a representative drawing of a digital camera system, including the digital computer. As shown in FIG. 9A, a digital camera 100 is detachably coupled to a computer 110, preferably via a serial link such as a RS-432 link. Whether or not computer 110 is coupled, digital camera takes discrete still digital images, compresses, and stores the digital data files representative of those digital images in its own memory. The memory used to store these digital files are preferably semiconductor memories such as DRAMs, RAMs, flash memories, and the like, although other forms of memories, including optical or magnetic disks, are also contemplated.

Digital computer 110 includes host software (not shown in FIG. 9A) for extracting from digital camera 100 data representative of either a thumbnail sketch image representative of a full image, a partial image, or a full image previously taken. The host software then analyzes the transferred data file, decompresses the data file if necessary, and displays the full or partial image or its thumbnail sketch on screen 120 or printer 140. The host software preferably includes facilities for manipulating, responsive to a user's input via a keyboard 130, the data files as well as the images those data files represent.

Figure 1:
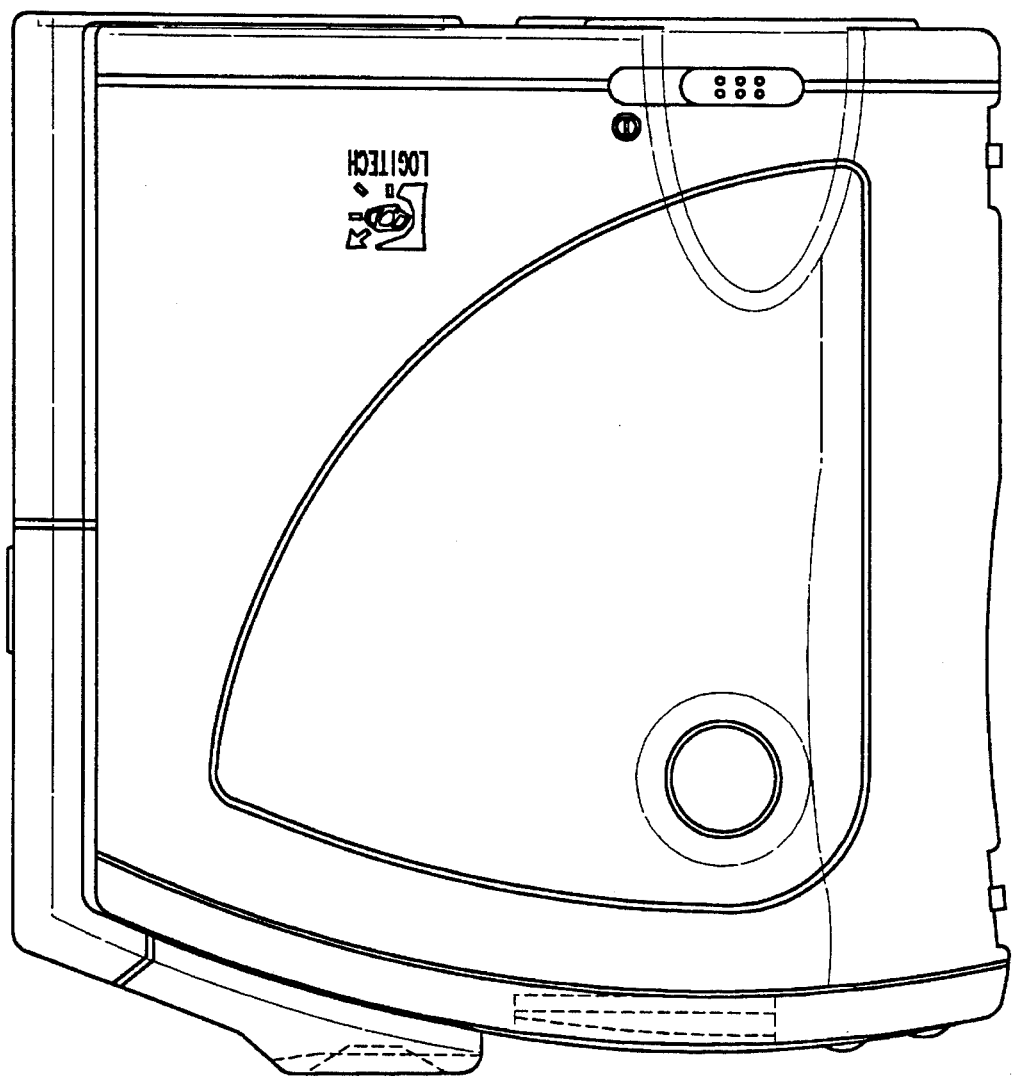
FIG. 1 is a top planar view of the digital camera of the present invention.
Figure 4:
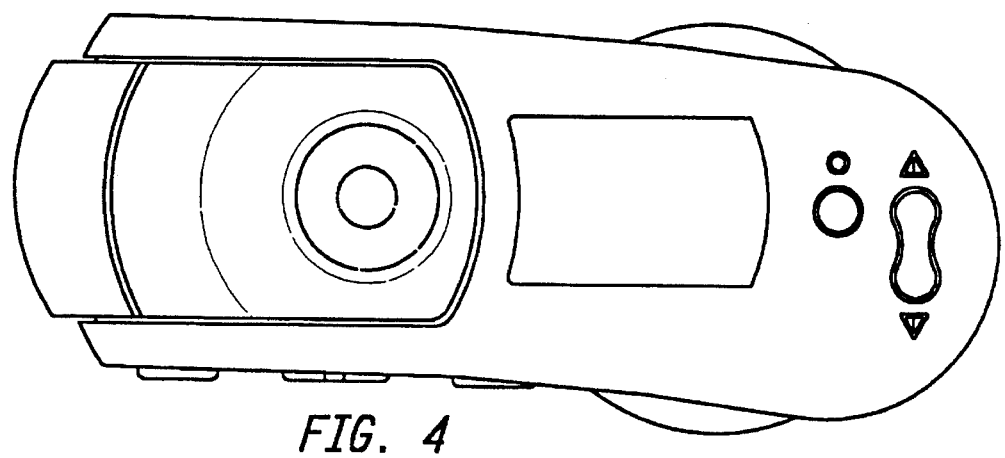
FIG. 4 is a back planar view of the digital camera.
Figure 3:
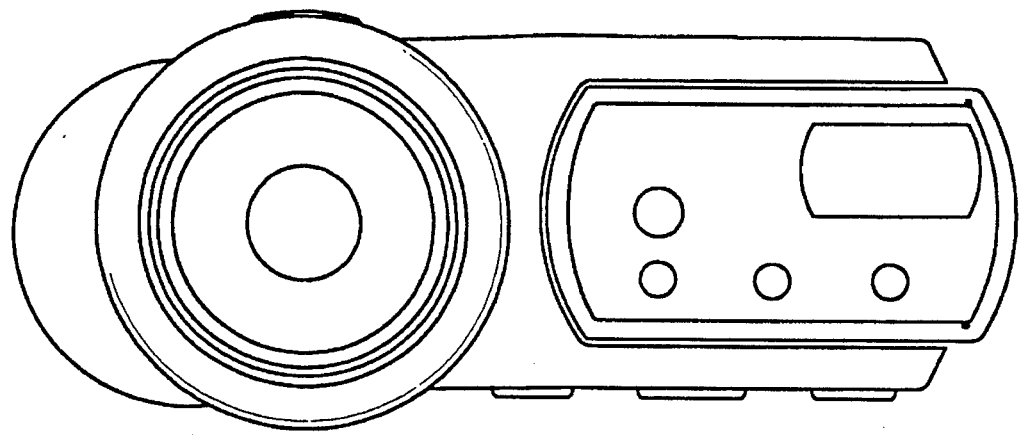
FIG. 3 is a front planar view of the digital camera.
Figure 2:
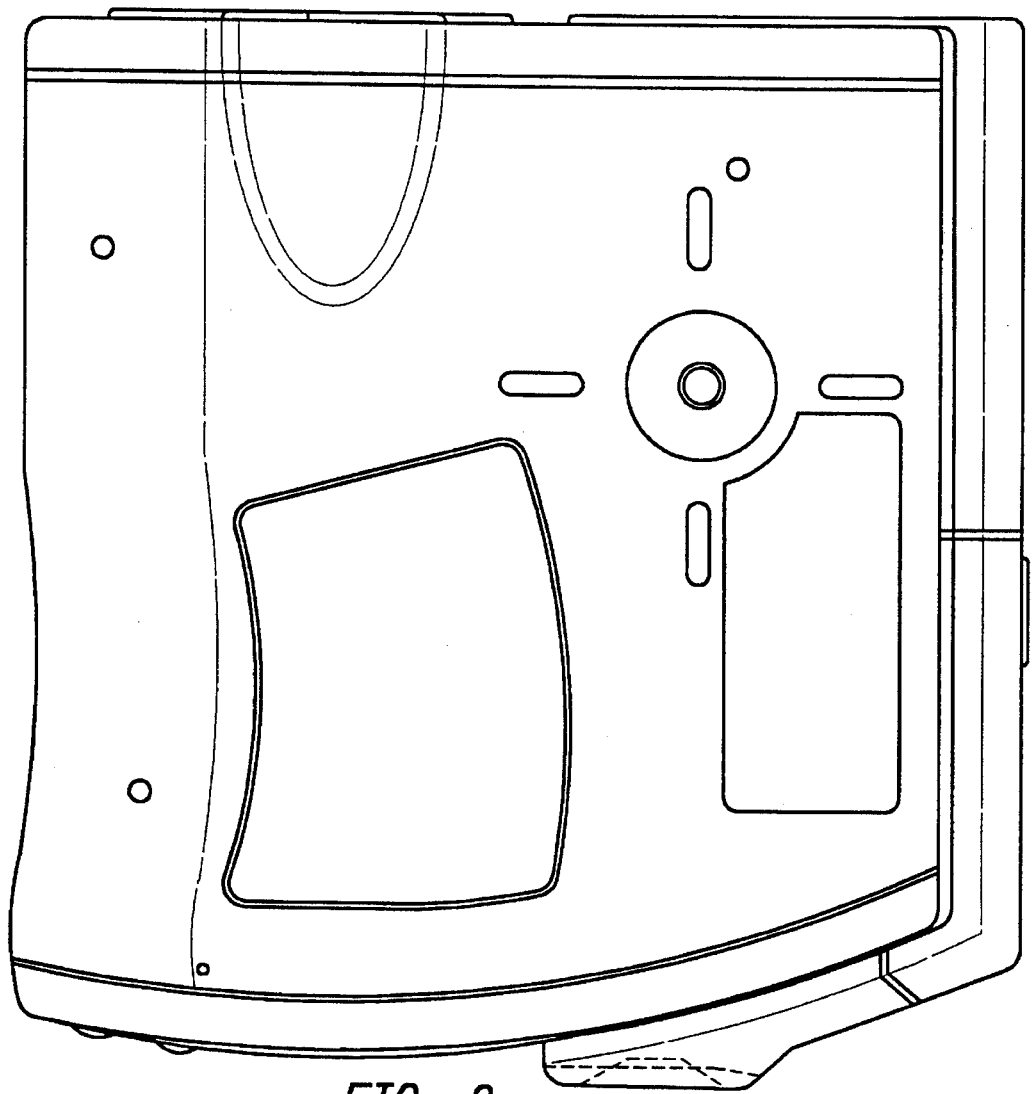
FIG. 2 is a bottom planar view of the digital camera.
Figure 5:
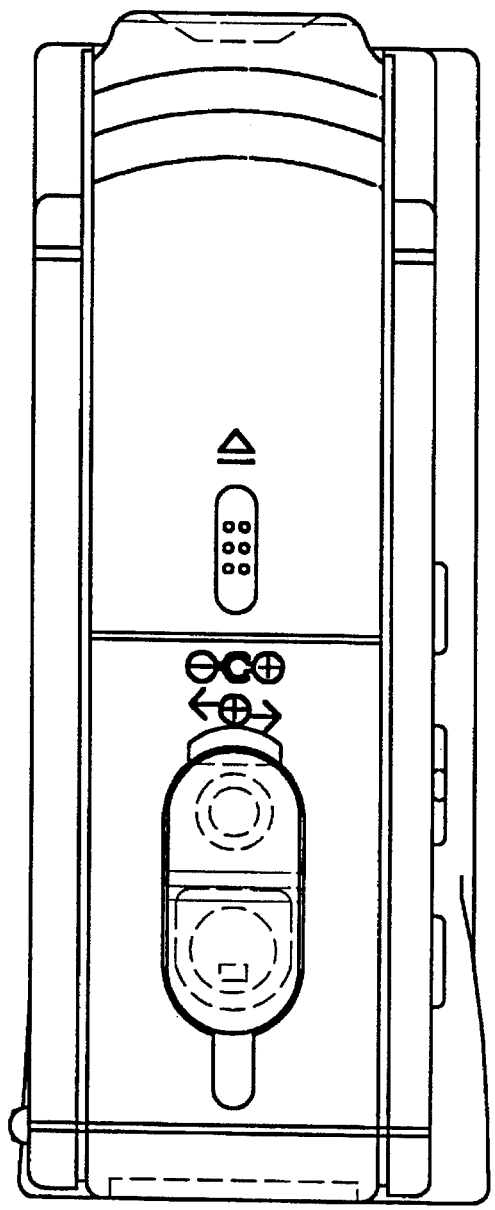
FIG. 5 is a right side planar view of the digital camera.
Figure 6:
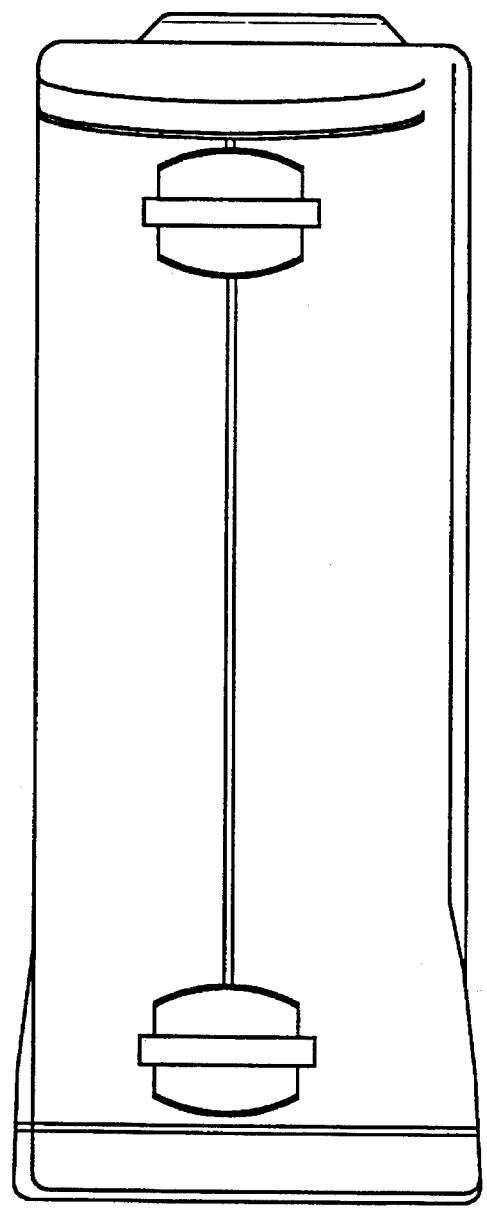
FIG. 6 is a left side planar view of the digital camera.
Figure 7:
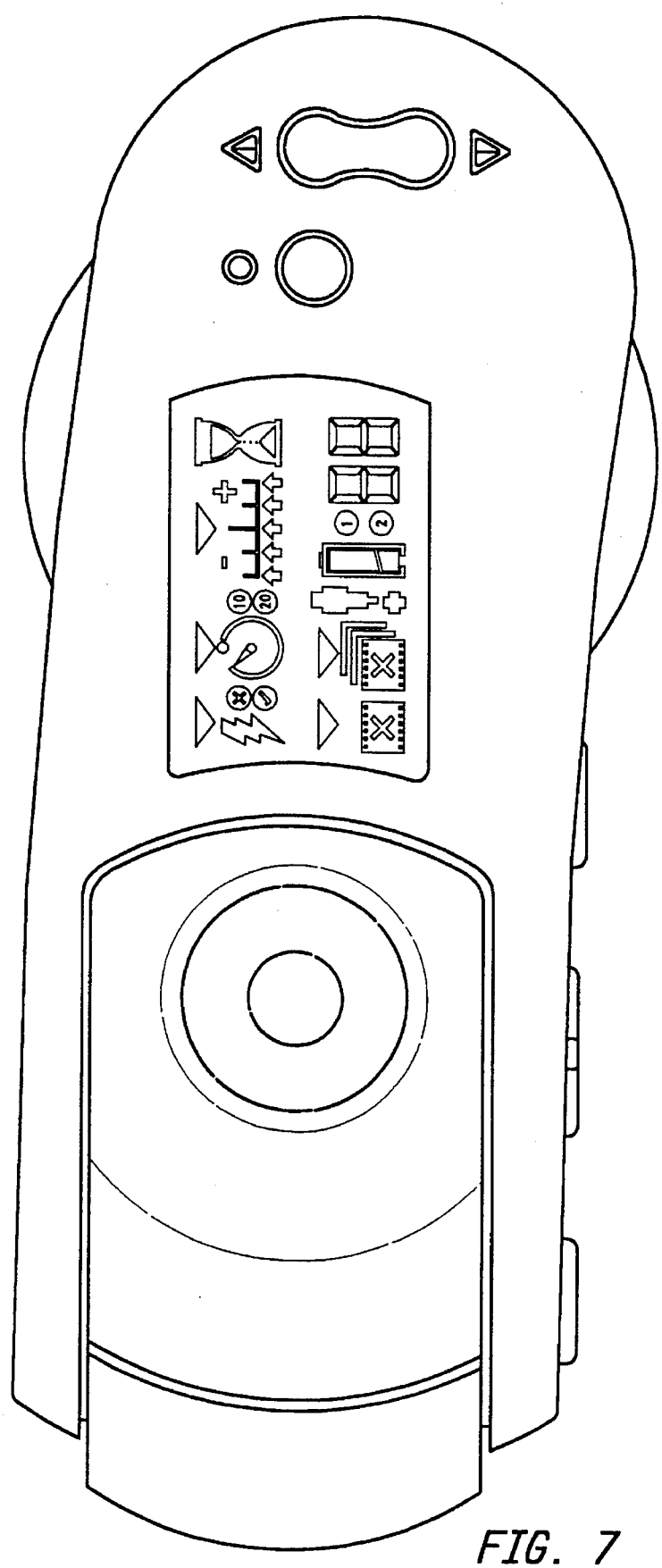
FIG. 7 is a perspective view of the user interface, including the icon LCD.
Figure 8C:
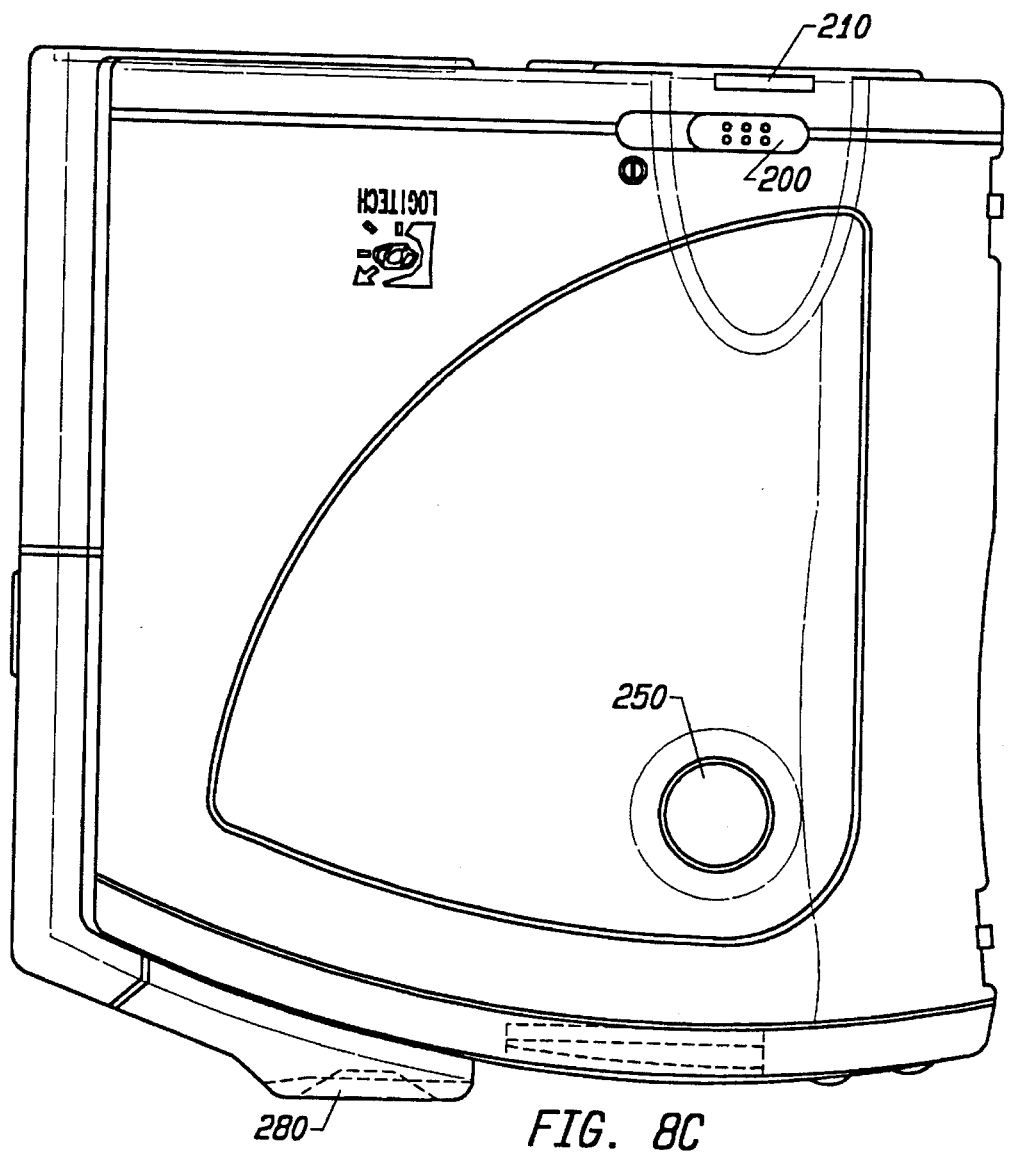
FIG. 8C shows the top view of the digital camera.
Figure 8A:
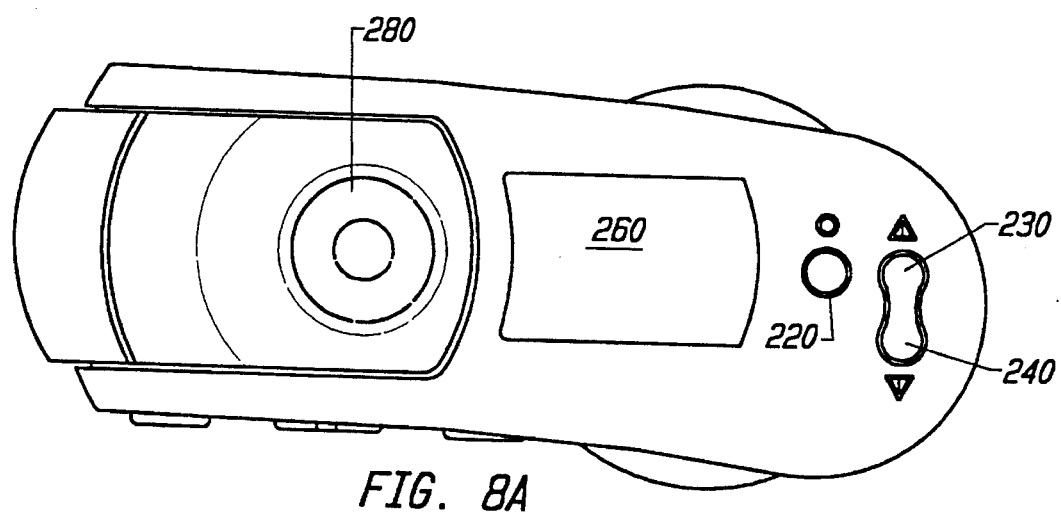
FIG. 8A shows the back view of the digital camera.
Figure 8B:
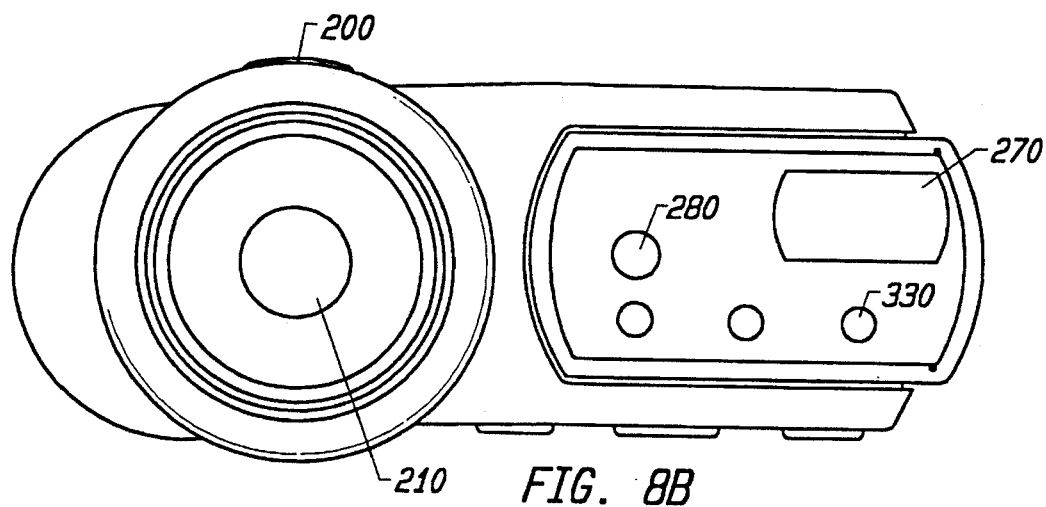
FIG. 8B shows the front view of the digital camera.
Figure 8D:
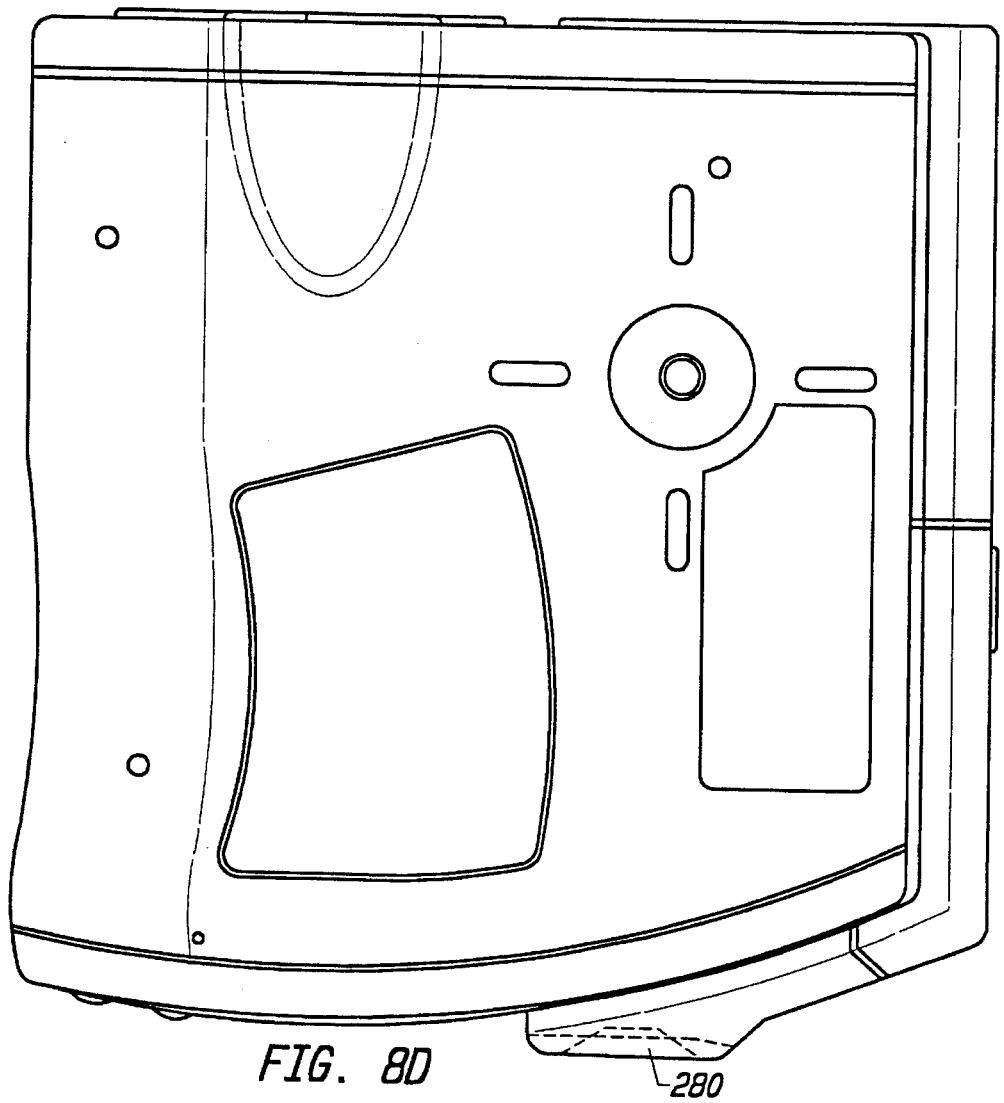
FIG. 8D shows the bottom view of the digital camera.

The camera implements an improved camera user interface. As shown in FIGS. 8A, 8B, and 8C, this interface includes an on/off switch 200 preferably integrated into a lens cover 210, three function buttons 220, 230, and 240, a shutter button 250, one external LED 390 (not shown), a "beeper" (also not shown) and an LCD 260. The interface facilitates the inclusion of an expanded set of camera features/functions that are also supported by host software.

FIG. 8B shows an integral lens cover 210 that also acts as an on/off switch for the camera. When lens cover 210 is less than fully open, the camera does not keep a flash 270 charged or turn on LCD 260 or respond in any way to any button presses. Further, an indicator will be visible in a viewfinder 280 whenever lens cover 210 is less than fully open.

As shown in FIGS. 8A and 8C, there are four buttons on the camera: shutter button 250 and three function or "command" buttons for controlling the options available to the user. The three command buttons are Tab 220, Plus 230 and Minus 240. In one embodiment, Plus button 230 and Minus button 240 are grouped together (Plus above Minus) to form a rocker switch, and the Tab button 220 is to their left.

Tab button 220 advances the selection to the next selectable function icon. The available icons are shown in greater detail in FIG. 9B. Icons that are selectable in LCD 260 include flash icon 330, delay timer 290, exposure offset 300, delete last picture 310, and delete all pictures 320. The selection preferably advances from left to right, and loops back to the upper left most function icon from the lower right-most function icon. It does not change the value or setting of any function, with the exception of Delete All Pictures 320 and Delete Last Picture 310. If the user tabs away from the delete icons 310 and 320 before pressing Plus button 230 one final time, the delete operation is aborted.

Plus button 230 increases the value setting of the currently selected function by one step, if that function has more than one possible value. It preferably does nothing if the function is already set to the "highest" value. Some functions such as flash represented by icon 330 and delete represented by icons 310 and 320 do not have a highest or lowest value, so the Plus button just cycles through the possible settings in those functions.

Minus button 240 decreases the value setting of the currently selected function by one step, if that function has more than one possible value. It does nothing if the function is already set to the "lowest" value. Again, functions such as flash and delete do not have a highest or lowest value, so Minus button 240 just cycles through the settings in the reverse order of the cycle traversed by pressing Plus button 230.

Referring to FIG. 8B, the camera uses one red external LED 390 to "count down" before exposing when the timer function is in use. External count down LED 390 will be the front of the camera, and must not be obstructed by any accessory lenses or other attachments. In one embodiment, external LED 390 is turned on when the timer is started (by pressing shutter button 250) and then blinks (on and then off) five times before the last second before exposure. Although other time values are possible, the duration of the five blinks is preferably 0.5 seconds on, then 0.5 seconds off, and LED 390 will stay on for the last full second before exposing. Further, the camera will also have a red internal LED (not shown in the figures) in the viewfinder to indicate "ready" (LED off) and "not ready" (LED on) status.

The camera also has a beeper, which is used as an alterative source for information presented on LCD 260 or the LEDs, and each of the two types of beeps (function button press and "events" [all other beeps]) may be turned off by the user (from the control panel on the host computer) separately. In one embodiment, the beep tone will have a frequency of 2 KHz, and a loudness of 25 decibels (measured 0.5 meters from the camera).

If a function button is pressed, the beeper sounds 1 beep for 0.1 second duration. To signify that the camera is ready to take pictures, the beeper sounds 1 beep for 0.5 second. To signify timer count down, the beeper sounds five beeps with an on/off pattern similar to the pattern of blinking LED 390.

The beep for a function button (Tab 220, Plus 230 or Minus 240) press will only sound when the button press will perform its function (i.e., the button press that wakes the camera from sleep does not emit a beep). Commands received from a host computer preferably do not cause the camera to beep.

Figure 8E:
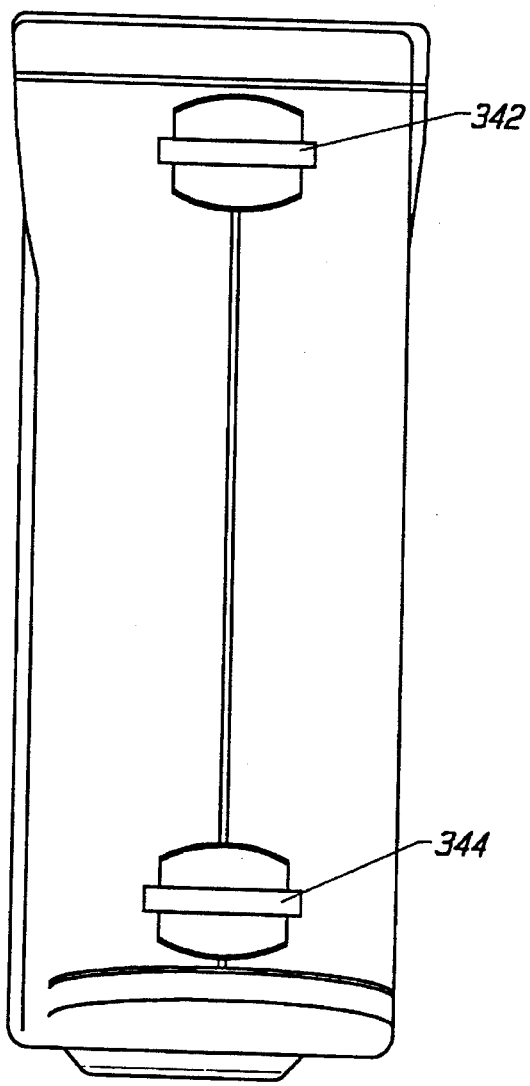
FIG. 8E shows the left side view of the digital camera.

FIG. 8E is a left side view of the digital camera. The left edge of the digital camera preferably includes two attachment hooks 342 and 344 for attaching a carrying strap.

Figure 8F:
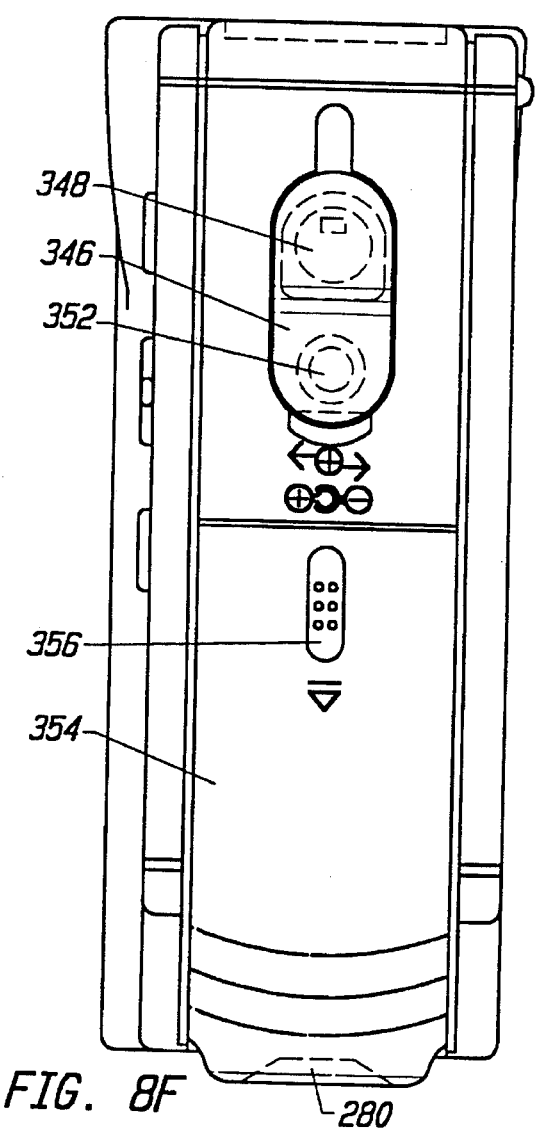
FIG. 8F shows the right side view of the digital camera.

FIG. 8F is a right side view of the digital camera. There is shown in FIG. 8F a cover 346 for covering two ports 348 and 352. Port 348 is a serial port for attaching the RS432 serial cable. As discussed earlier, the RS432 serial communication link enables the digital camera and the host computer to exchange data and commands. A battery compartment cover 354 is disposed on the right side of the digital camera. To aid in the removal of battery compartment cover 354 to replace batteries, a friction pad 356 is preferably molded into battery cover 354.

Figure 8G:
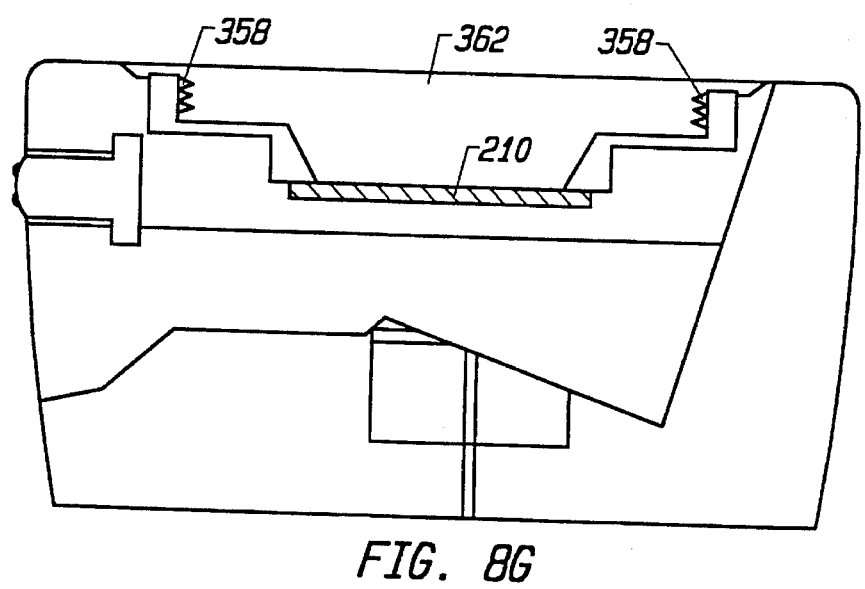
FIG. 8G is a simplified drawing of the lens assembly of the dial camera.

FIG. 8G is a simplified drawing of the lens assembly of the digital camera, including lens cover 210 and screw threads 358. Screw threads 358 advantageously defines an orifice for accepting aftermarket video camera lens attachment and permitting the still digital camera of the present invention to utilize lens attachment designed for the continuous motion video camera market. The ability to mate the digital camera of the present invention with accessories designed for an entirely different market greatly expands the capabilities of the digital camera. In one embodiment, screw threads 358 are advantageously located on a shoulder inside orifice 362, thereby reducing the risk of possible damage to screw threads 358 due to improper handling as well as contaminants fouling the screw threads.

Figure 9B:
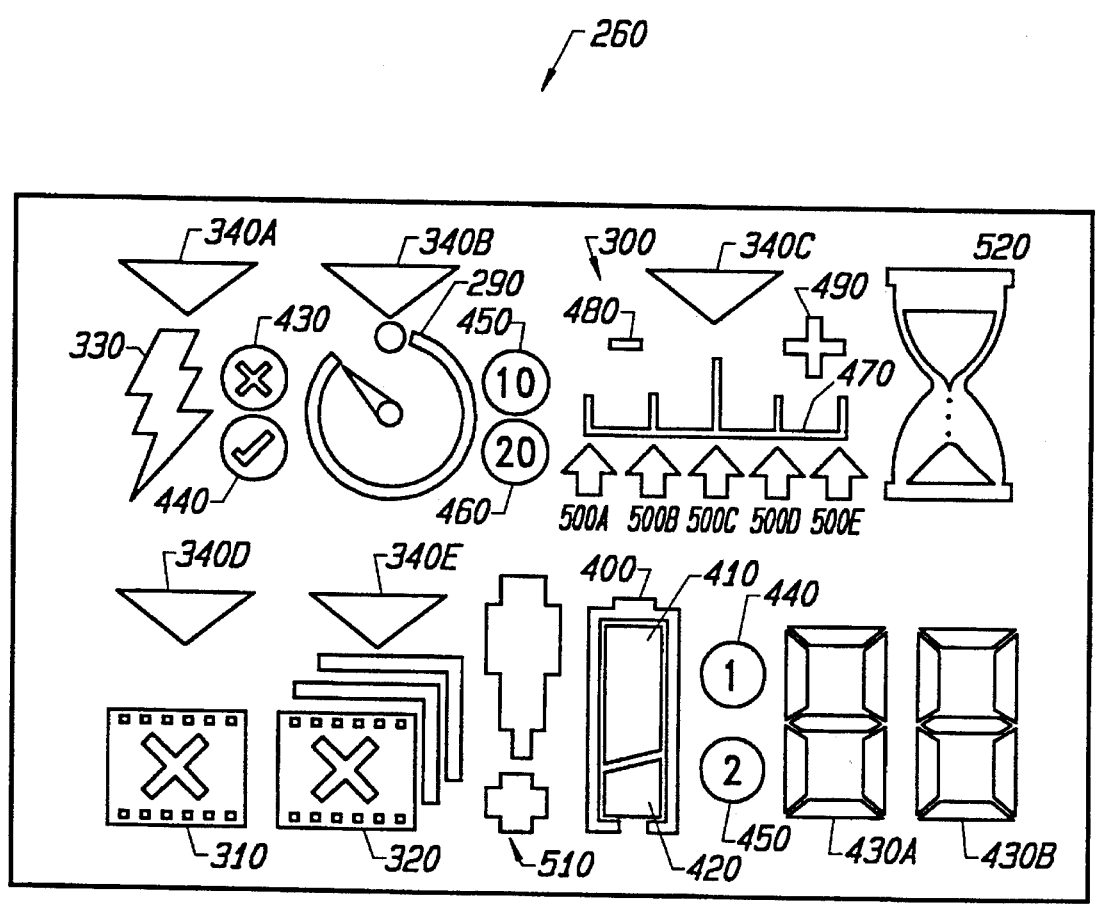
FIG. 9B is an illustration of the LCD interface of the digital camera.

LCD 260, illustrated in FIG. 9B, is an "icon" LCD as opposed to bit-mapped. In one embodiment, the user interface design requires 40 LCD segments. Icons that represent functions such as flash 330, delay time 290, exposure offset 300, and delete last picture 310 or delete all pictures 320) may be selected by the user. Selection of a function icon is indicated by a marker segment above the icon. For example, FIG. 9B shows five marker segments 340(A)–340(E) above each of the selectable functions respectively. If a condition exists where a given function is not selectable, e.g., because of current camera state or due to firmware selection, its icon will be turned off. There is exactly one selected function at all times.

When the camera is first turned on, flash 330 will be the selected function. When the camera wakes up after sleeping, the selected function will be whichever function selected when the camera went to sleep.

The camera is preferably turned "on" and "off" using lens cover door 210 as a switch. From the user's perspective, there is no indication to distinguish asleep from off, other than the position of the lens cover door 210. When the camera is asleep, pressing shutter button 250 or any of the three function buttons wakes it up. This initial button press is discarded (i.e., cannot take a picture or change any camera setting). When the camera is first turned on, all user-adjustable parameters are reset to their defaults and the flash is charged (if the flash mode is "on" or "auto"). In the preferred embodiment, the defaults can be set via the host software. Once flash charging is done, the camera is ready to take pictures.

When the camera wakes up from sleep, user-adjustable parameters and the function selection are set as they were when the camera went to sleep, and the flash charging behavior is the same as for when the camera is first turned on. If the camera has been asleep but is not able to restore the user-selected parameters and function (e.g., loss of power while the batteries are being changed), the parameters and function selection will be set to their power-up defaults.

Figure 10:
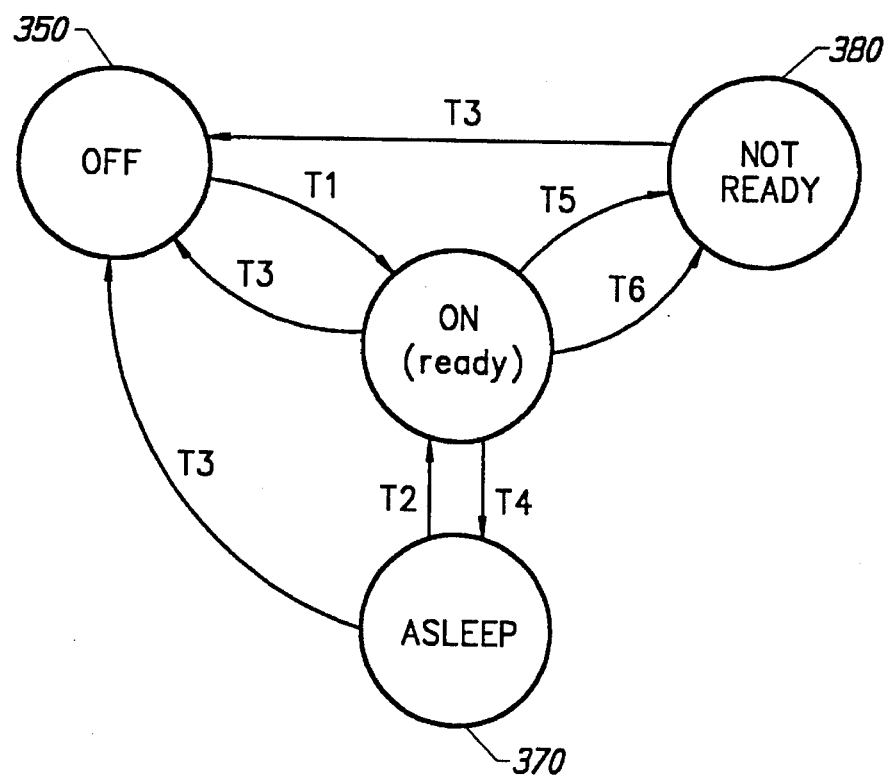
FIG. 10 is a state diagram illustrating the camera states.

FIG. 10 is a state diagram illustrating the camera states. As shown in FIG. 10, there are four camera states: off 350, on 360, asleep 370, and not ready 380.

"On" means both on and ready. Note that these states are defined from the user's perspective. In fact, the camera is always capable of communication with the host, even in the off mode 350, asleep mode 370, or not-ready mode 380.

When the camera is on, LCD 260 is on and all buttons function as expected. If the flash mode is set to either "automatic" or "on," the flash will be kept charged while the camera is on. Consequently, the ability to communicate with the host while the camera is off and draws little power is a significant advantage of the present invention.

When the camera is in the on state 360, it is "ready" to take a picture or perform any other function. If the camera is ready, LCD 260 will display the current values for the number of pictures remaining, the battery level, the flash mode, the timer setting, the exposure offset and the delete icon (if appropriate). If the camera is not ready LCD 260 will display only the hourglass icon, the number of pictures remaining and the battery level. Internal LED in the viewfinder is preferably turned on when the camera is not ready (and turned off when it is ready).

There are four reasons for the camera not to be ready: the flash is enabled (auto or on) but not fully charged, the camera has not finished processing the most recent picture, the camera is busy processing serial data or serial/user interface commands, the camera is in ROM mode.

In all cases, it is desirable to minimize the amount of "not ready" time. In one embodiment, the "not ready" time is reduced by imposing the following limitations: initial charging of the flash (camera on or wake-up) must not exceed 10 seconds (with fresh batteries), image processing and storage time must not exceed 5 seconds, after a flash picture, the combined time to process and store the image and refresh the flash charge must not exceed 10 seconds (with fresh batteries), typical time to delete last image shall be 10 seconds, and must not exceed 20 seconds, and typical time to delete all images shall be 25 seconds.

Closing lens cover 210 turns the camera off. In this state LCD 260 is turned off (even if the camera is communication with the host) and none of the buttons do anything. The flash is not kept charged. If the camera is connected to a host computer it will communicate normally except that it will not respond to a command to take a picture.

If the user closes lens cover 210 when the camera is not idle (e.g., processing an image after exposure or processing a serial or user interface command), LCD 260 is turned off immediately but the processing continues to completion. If the user turns the camera back on before completion of this processing, the LCD is immediately turned on and set to reflect the processing in progress.

If the camera suffers an unexpected loss of power during any operation, it preferably completes that operation when power is restored (regardless of whether the camera is on or off). The only exception is the interruption of the processing/storage of an image. If none of the image has yet been stored to memory, the camera reverts to the state it was in prior to taking the picture (i.e., the number of remaining images and the image capacity are not changed). If the image has been partially stored, the number of remaining images is decremented and the image is marked (internally) as invalid. When a host system requests image information the camera returns an Image Status Block (including a "dummy" thumbnail) that indicates the image is not valid and can not be transferred.

Asleep 370 can be thought of as a "sub-state" of on 360. The camera will only sleep if it has been on and idle (in terms of both the switches and the host interface) for longer than a predetermined sleep timeout value. When the camera is asleep LCD 260 is off and shutter button 250 is disabled. Any button press or receipt of a "wake up" command from the host returns the camera to the on state 360. The flash is not kept charged when the camera is in the asleep state 370.

Tracking of the button sleep timeout begins from completion of the last function/action initiated from any of the buttons on the camera. After a timeout period expires and no function/action is initiated during that timeout period, the camera enters the asleep state 370. Thus, the camera will never go directly from the "not ready" state to the sleep state.

The events capable of changing the camera states are illustrated symbolically by the use of arrows in FIG. 10. When the camera is in the off state 350, event T1 representing the opening of lens cover 210 causes the camera to enter the on state 360. Conversely, event T2 representing the closing of lens cover 210 causes the camera to enter off state 350 from on state 360. From on state 360, the camera can also enter asleep state 370 if a button sleep timeout event T4 is encountered.

When the camera is asleep in state 370, it can enter the on state 360 if any button on the camera is pushed. If the camera is connected to the host, a wake-up command from host would also cause the camera to enter on state 360 from asleep state 370. The pushing of any button or the issuance of a wake-up command from host causing the camera to enter the on state 360 from the asleep state 370 is represented symbolically by arrow T2. In its asleep state 370, the camera can also enter the off state 350 if lens cover 210 is closed.

Even when the camera is in the on state 360, there are events rendering the camera are not ready to take pictures or to undertake the next task assigned to it by the user or the host. For example, the charging of a flash, the delay associated with processing either host or user interface commands, or the processing of images taken may render the camera incapable of immediately taking the next picture or processing the next task. These events causing a camera in its on state 360 to enter the not ready state 380 are collectively illustrated by arrow T5. Conversely, the completion of a task represented by arrow T5, e.g., the completion of flash charging or command processing, causes the camera to enter the on state 360 from the not ready state 380.

Of course, the camera only enters the on state 360 from the not ready state 380 only if cover lens 210 is still open. If cover lens 210 is closed, the camera will immediately return to the off state 350. This condition is represented symbolically by arrow T3.

LCD 260 design requires 40 LCD segments. This following section will discuss the meaning and function of all the segments. FIG. 9B shows the proposed design and layout of the icons on the LCD.

The icons that represent selectable functions, i.e., flash 330, delay time 290, exposure offset 300, delete last picture 310, and delete all pictures 320, each have an associated selection indicator segment 340 (A–E) for the purpose of indicating the currently selected function. Only one of selection indicator segments 340 (A–E) will be on at any given time. Each of the five selection indicators 340 (A–E) consists of a single LCD segment.

The state of an icon (i.e., which segments are turned on) indicates the current status or setting for the function represented by that icon.

In one embodiment, the icon blinks by being turned off for 0.5 second and then on for 0.5 second (once per second, 50% duty cycle) for the duration of the blinking.

Battery

Referring to FIG. 9B, when the camera is on, the relative battery level is displayed at all times. Three battery levels can be displayed: "OK" (segments 400, 410 and 420 all lit), warning (nearly empty) (segments 400 and 420 lit) and empty (only segment 400 lit).

Sensing of the "empty" battery level should preferably set high enough so that it prevents the user (and host) from initiating any operation (e.g., taking a picture, erasing images) that might require more power to complete the operation than is available.

When the camera is powered from an external supply, all three battery icon segments are turned off.

Remaining Pictures

LCD 260 will display the number of remaining pictures at the current resolution setting (normal or snapshot). Note that for a given amount of available memory space, the number of remaining pictures varies inversely with the resolution setting. The number preferably consists of one or two standard seven-segment digits 430A and 430B and the appropriate annunciator (segment 440 for numbers from 100 to 199, segment 450 for 200 and above).

The number of remaining pictures (at the current resolution setting) will be indicated by seven segment digits 430A and 430B, and one of the two "annunciators" (for numbers greater than 99). To save power, the camera preferably displays one digit for numbers less than 10 (i.e., no leading "0"). Numbers greater than 99 will be displayed via the two seven segment digits and the appropriate annunciator if necessary.

Flash

The user may select automatic flash (i.e., the camera determines when to use the flash), flash on (force the camera to flash) or flash off.

The flash control icon consists of three segments: the flash symbol 330, flash off indicator 430, and flash on always indicator 440. When flash control is selected, the Plus and Minus buttons cycle through the three flash control states.

Shutter Delay

The user may select a shutter delay time of 10 or 20 seconds, or no delay. When shutter button 250 is pressed, the camera will wait until the preselected delay time has elapsed before taking a picture. The "count down" LED 390 will blink and the beeper will sound once per second for the final 5 seconds to indicate when the camera is about to take a picture.

The shutter delay icon consists of three segments: the delay symbol 290, ten-second indicator 450, and twenty-second indicator 460. When delay is selected, the Plus and Minus buttons cycle through the three delay states.

If a delay is selected and the shutter button has been pressed (starting the timer), pressing any of the three function buttons 220, 230, or 240 will abort the timer and picture taking process.

Exposure offset

The user will be able to select an exposure value that is an offset of plus or minus up to two steps from the exposure that the camera automatically determines is correct. The step size is one half f-stop.

The exposure offset icon consists of six segments: the three segments 470, 480, and 490 making up the scale bar and five pointers 500 (A–E), one under each of the scale bar 470 tick marks.

When exposure offset is selected, the Plus and Minus buttons cycle through the following five exposure options.

Delete Last Picture

The user will be able to delete the most recent picture from the camera memory.

The delete last icon consists of a single segment 310. When the delete last function has been disabled (via the host software), the delete last icon 310 and its selection marker 340 (D) are never visible. (Tabbing skips this icon/function in this case.)

When the delete last function is selected, pressing the Plus button indicates that the user wishes to delete the last picture taken. If there are any pictures in the camera, a warning icon 510 will be turned on and the Delete Last icon 310 will blink, and a second press of Plus button 230 will execute the delete operation. If the camera is already empty, nothing on the display (or in the camera) will change. Pressing the Tab, Minus or shutter button at this point will abort the delete process and perform the appropriate action for that button (the Minus button simply returns to the previous state). The warning icon 510 will turn off, the delete icon 310 will blink for the duration of the operation, and the remaining pictures count will be increased by one after completion of the operation.

Delete All Pictures

Referring to FIG. 9B, the delete all icon consists of a single segment 320. When the delete all function has been disabled (via the host software), the delete all icon 320 and its selection marker 340 (E) are never visible (Tabbing skips this icon/function).

The user will be able to delete all pictures from the camera memory (i.e., clear the camera) via either the camera's user interface or vias the host software.

When delete all is selected, pressing Plus button 230 indicates that the user wishes to delete all images from the camera. If there are any pictures in the camera, the warning icon 510 will be turned on, the Delete All icon 320 will blink, and a second press of Plus button 230 will execute the delete operation. If the camera is already empty, nothing on the display 260 (or in the camera) will change. Pressing the Tab, Minus or shutter button at this point will abort the delete process and perform the appropriate action for that button (Minus button 240 simply returns to the previous state). Warning icon 510 will turn off, delete all icon 320 will blink for the duration of the operation, and the remaining pictures count will be set to the maximum (for the current resolution mode) after the operation is complete.

Figure 11:
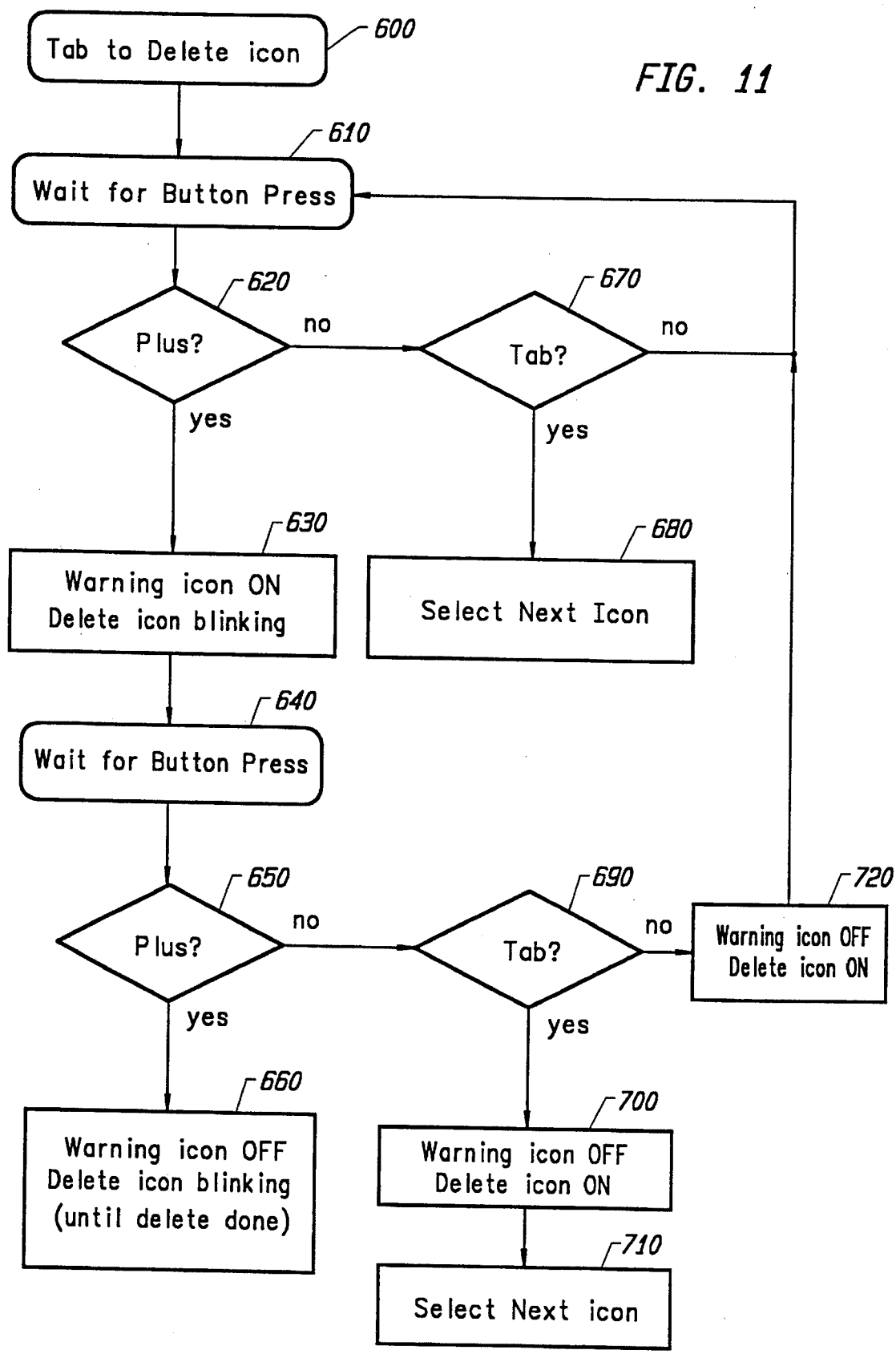
FIG. 11 is a flowchart illustrating the behavior of the user interface for both types of delete operations.

FIG. 11 is a flowchart illustrating the behavior of the user interface for both types of delete operations (Delete Last and Delete All). Referring to FIG. 11, the user selects one of the two delete modes by tabbing to either the delete last picture icon 310 or the delete all pictures icon 320 (step 600). After the appropriate delete icon is selected, the camera enters its wait for button press mode (step 610). If plus button 230 is pressed while the delete last picture icon 310 or the delete all pictures icon 320 is selected (step 620), warning icon 510 will turn on and delete icon will blink (step 630 and step 640) to warn the user that the next press of plus button 230 will execute the delete function.

Pressing plus button 230 while warning icon 510 is on and one of the delete icons blinking will execute the delete function (step 650 and step 660). Note that warning icon 510 is preferably off while the delete operation is being carried out.

If a delete icon is selected but not blinking (step 600), the next tab (step 670) will advance the selection to the next icon for executing another function (step 680).

If a delete icon is selected and blinking and warning icon 510 is on, the next tab button 220 press (steps 690–710) will turn off warning icon 510 and the selected delete icon (step 700) and advances the selection to the next icon for executing another function (step 710). However, if the next button press is not a tab (steps 690 and 720), the camera will turn off warning icon 510 and the selected delete icon (step 720) and continues to wait for the next button press (step 610).

Hourglass

The hourglass icon consists of a single segment 520. It is used to indicate the "not ready" status.

In addition, when the camera is ON and in ROM mode (including during the actual downloading of firmware), LCD 260 will display only hourglass icon 520, unless the camera is known to have "bad" firmware or a hardware error.

Warning

The warning icon consists of a single segment 510 as shown in FIG. 9.

As discussed in connection with FIG. 11, pressing Plus button 230 while delete last icon 310 or delete all icon 320 is selected will turn on warning icon 510 to warn the user that the next press of Plus button 230 will execute the delete function. Warning icon 510 will stay on until the function is started, or the user aborts the function (by pressing any other button), or the camera goes to sleep or is turned off.

If the user presses shutter button 250 when the battery level is too low to take a picture, warning icon 510 will turn on and battery icon 400 will blink for 10 seconds.

If the user presses shutter button 250 when the camera is full, warning icon 510 will turn on and the number of pictures remaining, i.e., zero, will blink for 10 seconds.

When the camera is ON and an error occurs, LCD 260 will display warning icon 510 and a two digit code in the numeric portion 430A and 430B. If the error is correctable via downloading new firmware, the code will preferably be "00". All other errors (codes "01" through "99") will preferably be defined as requiring the user to call customer support. These other codes advantageously aid in servicing the camera (and allowing customer service to track the reasons for returns for service). In the event of this type of error, the camera assumes a button timeout of one minute if it cannot determine the user-specified button timeout.

It is contemplated that the warning icon has other uses, indicating, for example, either that the user is about to perform a "destructive" operation or that an operation has failed in some way.

Figure 12:
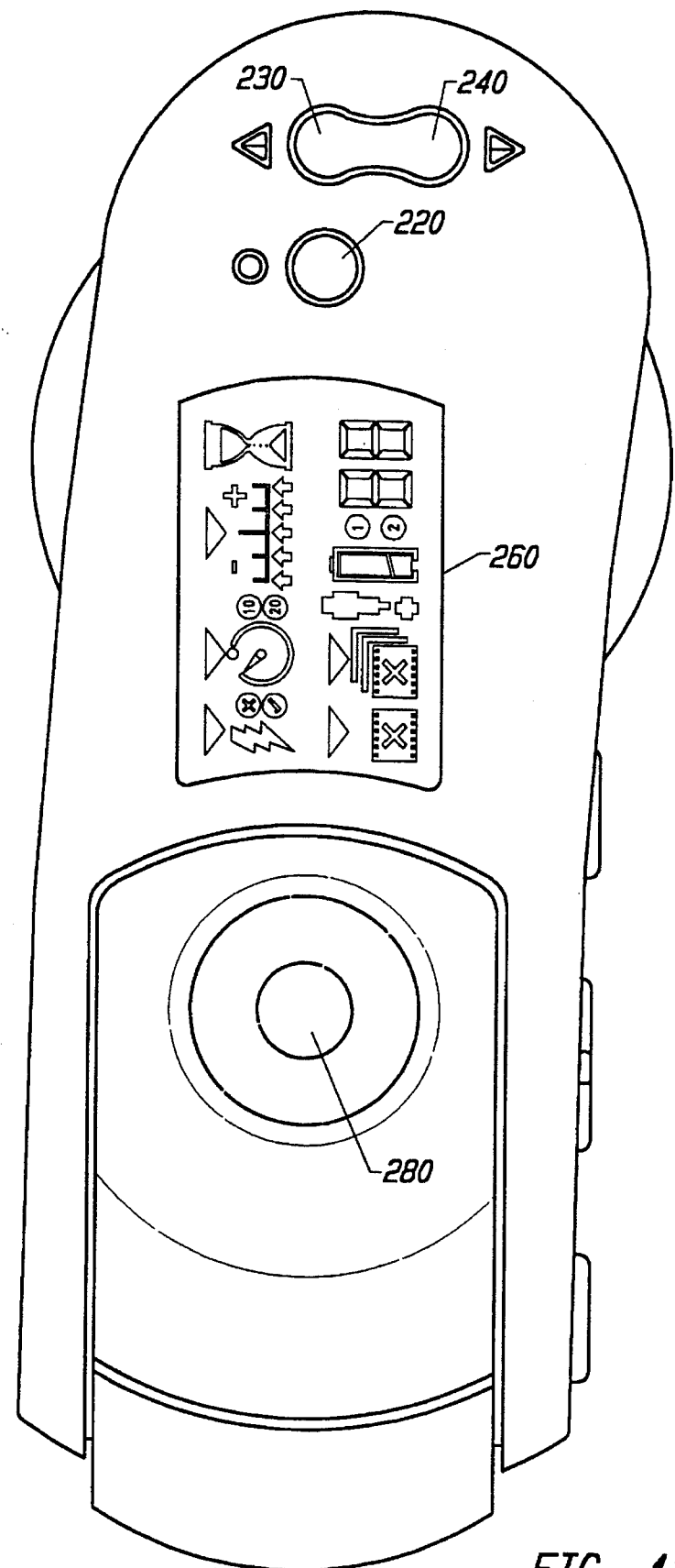
FIG. 12 shows the general layout of the LCD interface, the view finder, tab button, plus button, and minus button.

FIG. 12 shows the general layout of LCD 260, viewfinder 280, tab button 220, plus button 230, and minus button 240.

As can be seen, the new user interface has made possible the addition of several new functions and operating modes: flash mode (automatic, always on, or always off), timer (for delay from shutter press to taking picture), exposure offset (± up to 1 f-stop from the calculated automatic exposure), delete last picture, delete all pictures.

The available status information includes lens covered/ camera off warning, a battery level, number of pictures remaining, readiness of the camera to take a picture, warning indicator (used before deleting images).

All of the above status, functions, and operating modes can also be viewed and/or set via the camera control software on the host system. In addition, the host software can set the following camera parameters: date & time, sleep timeout (number of minutes of idle time before camera will "sleep"), power-up defaults (settings for flash, exposure offset & timer that will be used whenever the camera is turned on): image mode (full or quarter resolution), enable/ disable delete last picture, enable/disable delete all pictures, and enable/disable beeper.

When the camera is on, changes in the status or control of the camera that are initiated by the host will also be displayed on the camera LCD.

The primary functions of an interface between the digital camera and its host include functionally controlling the camera from the host, allowing the host to determine the status of the camera and the images stored in it, and providing an efficient means of moving image data from the camera to the host.

The host computer preferably has control over all the operations of the camera. This control includes any function executable by the user via the camera user interface (U), as well as functions that can only be executed from the host (such as setting the camera date and time). Commands from the host that are remote versions of U functions cause the same "output" (buzzer, LCD or LED state) as when performed via the U. Further, host software is able to gather complete information on the camera's status to facilitate control of the camera and to provide complete status information to the user (beyond what is available via the U). Because the image files from the digital camera are relatively large, the interface should preferably adds minimal overhead when retrieving them from the camera.

The major components of the digital camera host interface are the format of the data and commands that are exchanged, flow control (handshaking), and the data and command content. The interface is based on the assumption that the host system is preferably the "master" and the camera is a "slave". Thus, commands are sent from the host to the camera, and data flows from the camera to the host (with the exception of firmware and calibration data sent to the camera).

To aid in debugging, most commands and data (except for images) are transmitted as printable ASCII characters.

All data from the camera, and firmware downloaded to the camera, is sent in packets. Commands sent from the host to the camera are not packetized. A packet of size n is defined as containing n-1 bytes of data followed by one checksum byte. The checksum is preferably calculated by serially XOR-ing together all the data bytes in the packet. The default packet size for data coming from the camera is 16 bytes—the host may select a different size after establishing a connection. Firmware sent to the camera is preferably in 128 byte packets.

The data may be either status or image information. Status information is sent as a data structure (or "block") which may span multiple packets. Image data is sent as a stream (i.e., as if reading a file sequentially), and may also span multiple packets.

When data ends before the end of a packet (e.g., a 128 byte data structure in a 256 byte packet), the remainder of the packet may be filled with bytes of any value—it is the responsibility of the host to track the length of the data it is requesting.

Numeric data sent to the camera (as a parameter to a command) or received by the host (as parameters in status blocks) is in a modified hexadecimal format, or pseudo-hex, where an alternate ASCII character (consecutive with the ASCII characters for the decimal digits) is substituted for the usual hex digit as follows:

TABLE 1

| Hex Digit | ASCII |
|---|---|
| 0–9 | 0–9 |
| A | : |
| B | ; |
| C | < |
| D | = |
| E | > |
| F | ? |

For example, 0x1CFD is transmitted as 1<?=.

All commands begin with an Escape character (0x1B), which is followed by an ASCII character that indicates either a specific command or a class of commands. The character may be followed by one or more pseudo-hex parameters, depending on the command definition.

The host computer is responsible for control of the flow of communications. When the camera is sending data to the host, it waits for one of three signals from the host (acknowledge, not acknowledge or abort) before sending the next packet (the first packet is sent immediately after receiving the command and requires no signal).

The digital camera will support three "camera response modes", mute, acknowledge and ROM (described below). In addition, the camera will support an adjust mode. When the host sends commands to the camera, the response of the camera is determined by these modes. The default mode is mute. When the camera is in RAM mode (normal operation), the host can select mute or acknowledge mode via the "set camera configuration" command. When the camera is in ROM mode (if the firmware is invalid or new firmware is to be downloaded), the response mode is not selectable, and the responses are like either mute or acknowledge mode, depending on the command.

To allow for the possibility of the camera being otherwise busy, the host preferably waits a timeout period of 10 seconds before it can consider a packet or command to be incomplete. The timeout clock is reset either when the host finishes sending a command and is waiting for a response from the camera, when the host sends an ACK which it expects to be followed by more packets, or after each byte in a packet is received.

If the timeout expires, the host should consider its last command incomplete. This timeout applies to camera behavior between bytes and packets or (in acknowledge mode) between a command and the camera's ACK or NAK response. If the host software commands the camera to perform a "long" operation (e.g., delete all images), the host is made aware of the appropriate amount of time to allow for that command.

In one embodiment, the host does not queue commands to the camera. If a command requires a response from the camera, the host waits until the end of a packet (or packet timeout) and then send an abort signal (if there are still packets to be sent) before sending another command. According to this one embodiment, if the camera is busy processing a command (e.g., take picture) it is not required to buffer or respond to any other incoming commands.

In the mute mode, the digital camera will not send any unprompted data to the host (i.e., other than in response to a command). In the case of the host commanding the digital camera to perform a command that may take a significant time (e.g., take a picture or erase all images), the host polls the camera (using the ESC J or ESC S command) to know when the camera is ready to accept additional commands.

When the host sends a command that requires a response from the camera (e.g., Send Camera Status), the camera preferably waits for a response to each packet before sending the next one (or aborting the transfer). The host responses include ACK (0x06) acknowledge, i.e., packet completed and checksum OK; NAK (0x15) continue not acknowledge, i.e., packet incomplete or checksum bad; and CAN (0x18) re-send packet abort, i.e., cancel data transfer.

After sending a packet (including the last packet of a transfer), the camera waits for one of these three signals or a BREAK (or disconnection from the host) before processing any other communications. Any other character will be ignored/discarded.

In acknowledge mode, additional signals, to be sent by the camera, are defined to provide the host with feedback on the receipt and completion of commands.

The signals sent from the camera to the host in acknowledge mode include ACK(0x06) acknowledge, i.e., command accepted, starting execution; NAK(0x15) not acknowledge, i.e., command or parameter invalid; CAN(0x18) abort acknowledge, i.e., echoed back to host after camera receives a CAN; EOT(0x04) command completed, i.e., sent after completion of a command that does not require data in response (take picture, erase image, etc.)

If the camera receives an invalid or unknown command or command parameter, or detects a serial line error (e.g., framing error), it sends a NAK to the host and wait for further commands. A command may be invalid due to the current state of the camera (e.g., if the host sends a wake up command when the camera is turned off).

Upon receipt of a valid command that requires the camera to send data to the host (e.g., send camera status), the camera will send an ACK before sending the first packet of data. This ACK is not to be counted as part of the first packet. The camera does not send an EOT after completion, since the host can determine how much data to expect in response to these types of commands.

When the camera receives any valid command which does not require a response (e.g., take picture, erase image, etc.), it will send an ACK to acknowledge receipt and commencement of the command, and then send an EOT after completing the command. For some commands, e.g., wake up camera, the EOT will immediately follow the ACK. In one embodiment, an EOT indicates only that the camera is ready for additional commands, and not necessarily successful completion of the command.

When the host requests a change of the communication bit rate via a Select Bit Rate command, the camera will send the ACK at the rate at which the command was received. The ACK is the only response in this case, and it indicates that the camera has accepted the command and will be ready to receive new commands at the new rate 100 milliseconds after it has finished sending the ACK. It does not send the EOT, to prevent causing a serial error at the host (in the event that the host is not ready for the new rate).

When the camera is in ROM mode (due to the absence of valid firmware, or via the switch to ROM mode command), its response mode depends on the commands it receives. The camera does not respond to invalid commands (as in mute mode). There are only four valid commands in ROM mode: Send Camera Status Block (ESC S), Select Bit Rate (ESC B #), Select Packet Size (ESC 0 #), and Receive Firmware (ESC D).

The response to the Send Camera Status Block (ESC S) command is the same as in mute mode—the camera returns a Camera Status Block without any preceding signal. The Camera Status Block is only required to include the S, V, I and P fields (firmware type & version, identification number and power) when the camera is in ROM mode.

The response to the Select Bit Rate (ESC B #) command is the same as in acknowledge mode. The response to the Select Packet Size (ESC 0 #) command is the same as in acknowledge mode (see above). The only packets affected by this command (while the camera remains in ROM mode) are those used to send the Camera Status Block. The response to the Receive Firmware (ESC D) command is similar to the acknowledge mode, but modified as appropriate to the fact that the data is travelling to the camera.

The adjust mode is reserved for use at the factory, and includes the commands to toggle in and out of adjust mode (ESC zAJST) and to send a Camera Status Block (ESC S). When the camera is in RAM or ROM mode and receives the ESC zaJST command, it will send (only) an ACK, and enter the adjust mode. While the camera is in adjust mode, the data and command formats and the flow of control are considered undefined, except that the camera will send a NAK in response to unrecognized/invalid commands. The exceptions to this are that the camera accepts the ESC S command, and send a minimal Camera Status Block in response (using the same flow control as in acknowledge mode), or another ESC zaJST command (to toggle out of adjust mode), and respond with an EOT, at whatever bit rate the camera was using before entering adjust mode (the bit rate may not be changed in adjust mode).

The Camera Status Block format in adjust mode is the same as in ROM mode (the only required fields are S, V, I and P).

Electrically, digital camera will use RS-423 as the basis for communication with a host. The camera will have a female 8-pin mini-DIN connector with the pins wired as described in table 2. "RxD" and "TxD" are used in terms of the camera point of view.

TABLE 2

| Pin | Signal |
|---|---|
| 1, 2 | not used |
| 3 | TxD– |
| 4 | signal ground |
| 5 | RxD– |
| 6 | TxD+ |
| 7 | not used |
| 8 | RxD+ |

The digital camera preferably supports rates of 9600, 19200, 38,400, 57,600, 115,200 and 230,400 bits per second. The default rate (i.e., when first connected to the host) is 9,600 bits per second. All data is preferably transferred in 8 bit, no parity, 1 stop bit format.

The camera monitors the state of its receive data line several times per second. If the line is high (disconnected) the camera shuts down most functions to preserve power. If the line is low, it enables its processor and peripheral electronics. Setting a break signal (holding the line high for 200 milliseconds or more) on the serial port will cause the camera to treat the line as if it had just been disconnected. Setting a break between operations will conserve power.

In the inactive state, any activity on serial in will cause the camera to enter its active state. Conversely, in its active state, break (floating held high) or communication time out will cause the camera to enter its inactive state. The state is totally independent of the camera user interface states (as defined in the digital camera User Interface Specification), except that they share the same timeout parameter setting. In other words, the sleep timeout is applied to both the state of the user interface (buttons) and the communications lines, such that the sleep/inactivity time is determined from the last "event" of either type. The transition from inactive to active may take as long as 500 milliseconds.

Setting a break, or disconnecting the camera, will cause it to restore its default communication values of mute mode, 9600 bps and 16-byte packets. If the camera is in ROM or adjust mode and contains valid firmware, it will also be reset to RAM mode. If the camera is currently registering an error, the break/disconnect will reset (clear) the error condition and the failed operation will be retried at the next appropriate opportunity.

The Camera Status Block is the primary source of information about the state of the camera. It is sent by the camera in response to the Send Camera Status (ESC S) command. The fields within the block are preferably ordered as given below to simplify status block scanning. Reserved and unused fields may be omitted or, if sent, set to any value.

An ASCII space character (0x20) is used as a separator between each of the fields in the Camera Status Block. There are no spaces between field markers, such as "S" and the values that follow, or between multiple # values (each # represents four pseudo-hex digits).

Leading zeros may occur when values are at less than the maximum. Thirty two bit parameters fields (# # fields) may be returned as either 32 bits (eight pseudo-hex digits) or 16 bits (four pseudo-hex digits) when their value is less than 0XFFFF.

The block preferably consists of 127 bytes. Unused bytes after the last field are sent as spaces.

ROM and Adjust modes: When the camera is in ROM or Adjust mode, the S, V, I and P fields are required, and all other fields are optional.

TABLE 3

Camera Status Block

| Field | Description | Comments/Values |
|---|---|---|
| S# | Camera firmware type | The firmware type indicates the camera model/functionality. The firmware type also changes when the camera is switched between ROM and RAM modes. Koala will return (values are decimal):<br>40 for ROM mode<br>41 for RAM mode using ADPCM compression<br>42 for Adjust mode<br>43 for RAM mode using RADC compression |
| V# | Camera firmware Version | Firmware version indicates the loaded version of RAM code or ROM code, depending on the camera's current operating mode. The number 234 is interpreted as version 2.34. |
| C## | Configuration | See Configuration Code (below). |
| H# | Current image Height | Current vertical image size, in pixels. |
| W# | Current image Width | Current horizontal image size, in pixels. |
| A# | Reserved | |
| h# | Thumbnail height | Current vertical thumbnail size, in pixels. |
| w# | Thumbnail width | Current horizontal thumbnail size, in pixels. |
| N# | Number of images | The number of images currently stored in the camera. |
| B# | Battery level | Indicates the remaining energy as estimated by the firmware battery model. A value of 4096 or higher should be considered a full charge, a value of 410 indicates low battery (but still operational), and a value of 0 indicates the battery is "dead" or not present. Allowable range is 0 to 4143. |
| I## | Identification number | Camera identification number (see below). |
| T## | Time | Time in seconds since 00:00 on January 1, 1994. 32 bit number (eight hex digits). |
| P# | Power | 1 = external power supply is attached, 0 = not attached, 0xFFFF = camera is not capable of sensing power supply. |
| D## | Diagnostic/ready code | See Diagnostic Code (below) |
| n# | Current image capacity | Number of images the camera is capable of holding at time of status request. This is a function of the current resolution and delete modes. |
| X# | EXtended blocks | # of additional eXtend blocks that follow. Set to 0. |

The Configuration Code indicates the status and defaults of all camera modes. This bit set is returned as a part of the Camera Status Block and is sent by the host as part of the Set Camera Configuration command. It is defined as follows:

TABLE 4

Configuration Code

| Bit(s) | Meaning | Default value |
|---|---|---|
| 31 .. 24 | Sleep timeout value, in seconds (1..255) | 60 |
| 23 | Camera response mode (0 = mute; 1 = acknowledge) | 0 (mute) |
| 22 .. 20 | Default exposure offset (5 = −2 steps; 4 = −1 step; 3 = no offset; 2 = +1 step, 1 = +2 steps [step = ½ f-stop]) | 3 (no offset) |
| 19 .. 18 | Default timer mode (0 = no delay; 1 = 10 secs.; 2 = 20 secs. | 0 (no delay) |
| 17 .. 16 | Default flash mode (0 = automatic; 1 = on; 2 = off) | 0 (automatic) |
| 15 | Reserved | 0 |
| 14 .. 12 | Current exposure offset (5 = −2 steps; 4 = −1 step; 3 = no offset; 2 = +1 step, 1 = +2 steps [step = ½ f-stop]) | 3 (no offset) |
| 11 .. 10 | Current timer mode (0 = no delay; 1 = 10 secs.; 2 = 20 secs.) | 0 (no delay) |
| 9 .. 8 | Current flash mode (0 = automatic; 1 = on; 2 = off) | 0 (automatic) |
| 7 | Beep on function button press enable/disable (1 = enable) | 1 (enabled) |
| 6 | Beep on "event" enable/disable (1 = enable) | 1 (enabled) |
| 5 | Delete Last enable/disable (1 = enable) | 1 (enabled) |
| 4 | Delete All enable/disable (1 = enable) | 1 (enabled) |
| 3 .. 2 | Reserved | 0 |
| 1 .. 0 | Image resolution (0 = high res.; 1 = low res.; 2 & 3 reserved) | 0 (high res.) |

The defaults listed in Table 4 are those of the camera when it leaves the factory—they are also the values used when the host sends the Reset Camera command. In hex, the default values shown above are 0x3C3030F0 (in pseudo-hex, "3<3030?0").

Identification Number

The camera identification number is a 32 bit value consisting of two fields: the Firmware Compatibility Code (FCC) and the individual ID number. The FCC is used by host software to determine if a particular firmware package is compatible with a particular camera (each firmware package will include a list of valid FCCs for that package). The individual ID number is set at the factory, but may also be set by host software that needs a way to identify a particular camera. The format of the complete identification number is as follows:

TABLE 5

Identification Number

| Bits | Meaning |
|---|---|
| 31 .. 24 | Firmware Compatibility Code (0 .. 255) |
| 23 .. 0 | Individual ID number (0 .. 16,777,215) |

Diagnostic Code

This code indicates the on/ready/awake status of the camera, as well as any error codes from the camera. The diagnostic code will only indicate an error if that error condition exists at the time of the request for status.

TABLE 6

Diagnostic Code

| Bits | Meaning |
| --- | --- |
| 31 . . 24 | Error Code 3 |
| 23 . . 16 | Error Code 2 |
| 15 . . 8 | Error Code 1 |
| 7 . . 3 | Reserved (value undefined) |
| 2 | Camera sleep status (0 = asleep, 1 = awake) |
| 1 | Camera ready status (0 = not ready, 1 = ready) |
| 0 | Camera on status (0 = off, 1 = on) |

As shown in Table 6, the diagnostic code can simultaneously indicate up to three different error conditions. Error Code 1 is preferably used first, then Code 2 and then Code 3. Unused codes are preferably sent as 0 (zero). The following table lists all the error codes currently defined for the digital camera The columns "LCD", "Camera" and "Image" indicate where the indication of each type of error may be found ("Camera" means in the Diagnostic Code of the Camera Status Block, "Image" means in the E# field of the Image Status Block).

TABLE 7

Error Codes

| Code | LCD | Camera | Image | Description |
| --- | --- | --- | --- | --- |
| 00 | X | | | 8bit CPU download program checksum error. Recovers on successful firmware download. |
| 02 | X | X | | Flash Charge Error (Could not fully charge the flash in 10 secs). |
| 11 | X | | | 8bit CPU to 4bit CPU serial comm. data checksum error. |
| 12 | X | | | 4bit CPU to 8bit CPU serial comm. data checksum error. |
| 13 | X | | | 8bit CPU to/from 4bit CPU serial comm. timeout error. |
| A1 | X | | X | Compressed data write error to 8MBit flash memory. |
| D1 | X | X | | DSP to/from 8bit CPU comm. error No. 1 (Inner ROM program). |
| D2 | X | X | | DSP program verify error. |
| D3 | X | X | | DSP to/from 8bitCPU comm. error No. 2 (Outer ROM program). |
| E0 | X | | | General EEPROM error. |
| E1 | X | | | Unable to delete "Writing . . . " flag in EEPROM error. |
| FA | | | X | 8MBit flash memory write error. |
| FB | | | X | 8MBit flash memory Image Status write error. |
| FE | X | X | | 8MBit flash memory erase error. |

When errors 02, 11, 12, 13, D1, D2, D3 and FE occur, the camera goes into the Error mode to avoid any damage or any further retrying. For example, if error 02 (Flash Charge Error) was detected, the camera stops trying to charge the flash so as not to damage the camera (the cause of the error could be a current leak, for example). To force the camera to try again, you need to send the BREAK signal or power off the camera (reset).

Contact Status Block

This is a quick way for the host to determine if a camera is still connected, as well as some very basic status information. The Contact Status Block is the only exception to the camera packet size setting. It is preferably sent as a single 16 byte packet.

TABLE 8

Contact Status Block

| Byte # | Description |
| --- | --- |
| 1 . . 4 | Identification number (LAW; 0-65535) |
| 5 . . 8 | FotoWare version number |
| 9 . . 12 | Battery level |
| 13 . . 14 | Number of pictures in camera |
| 15 | Power (AC Adaptor) ("1" = attached, "0" = not attached, "?" = camera is not capable of sensing) |

Image Status Block

The Image Status Block is the source for information about the Images in the camera. It is sent by the camera in response to the Send Image Status Block (ESC A) and Send Image Inventory (ESC 1) commands, preceding the thumbnail data.

All fields are included in every block, and are ordered as given below to simplify status block scanning. Leading zeros may occur when values are at less than the maximum (i.e., all "#"s are four digits). Thirty two bit parameters fields may be returned as 16 bits (four hex digits) when their value is less than OxFFFF.

An ASCII space character (Ox2O) is used as a separator between each of the fields in the Camera Status Block. There are no spaces between field markers, such as "S" and the values that follow, or between multiple # values (each # just represents four pseudo-hex digits).

Leading zeros may occur when values are at less than the maximum. Thirty two bit parameters fields may be returned as either 32 bits (eight pseudo-hex digits) or 16 bits (four pseudo-hex digits) when their value is less than OXFFFF.

The block consists of 127 bytes. Unused bytes after the last field are sent as ASCII spaces (0x20). Thumbnail data preferably begins at the beginning of the next packet after the complete Image Status Block has been sent. In the case of a "bad" picture, the thumbnail data sent by the camera should be considered as random (i.e., not necessarily valid thumbnail image data) by the host system, but will be the same length as a valid thumbnail.

TABLE 9

Image Status Block

| Field | Description |
| --- | --- |
| S## | Size of compressed image (0 indicates bad/corrupted picture) |
| E# | Length of exposure in 10 microsecond increments or error code (see below) |
| T## | Number of one second ticks at the time of picture taking (32 bits) |
| F# | Use of flash during image capture (0 = no flash, 1 = flash) |

In the event of bad/corrupt picture data, the size of an image will be returned as 0 (zero) and the E # field will contain an error code if the cause of the error can be determined.

Camera Matrix

The camera matrix is used by the host software when processing the image data from the camera. It is returned in response to the Receive Table command when the table selection parameter is 1.

The camera matrix uses four bytes for the version number (NN.NN where the '.' is implied) and 96 bytes for the matrix itself, followed by one checksum byte (a total of 101 bytes).

The matrix consists of 12 values (4×3) of 8 bytes each, in row sequence, with the format of [±] [N] [N] [N] [N] [N]×10/1 [±] [M].

Sign bytes are represented by 1 for negative values (−) and 0 for positive values (+). [N] [N] [N] [N] [N] is the value which is raised to the ± [M] magnitude. Thus, the matrix element given by 02345612 is the value +234.56.

Compression Tables

The compression table is used by the host software to uncompress the image data from the camera. It is returned in response to the Receive Table command when the table selection parameter is 2. The type of compression is determined via the S # field of the Camera Status Block.

The compression tables are in the formats shown in Table 10 for ADPCM and Table 11 for RADC. The version number exists in the matrix table. All Compression Table data is sent in binary format (not pseudo-hex).

TABLE 10

| Data | Size (bytes) |
|---|---|
| Version Number | 4 |
| Algorithm ID | 1 |
| Table ID | 1 |
| Green Selection Table | 8 |
| Green Decode Table | 64 |
| Color Difference Selection Table | 8 |
| Color Difference Decode Table | 16 |
| Checksum | 1 |
| Total | 103 |

TABLE 11

| Data | Size (bytes) |
|---|---|
| Version Number | 4 |
| Algorithm ID | 1 |
| Table ID | 1 |
| Options (Reserved) | 8 |
| Residual Values | 41 |
| Residual Huffman Lengths | 41 |
| Overhead Huffman Lengths | 81 |
| Algorithm 3 bit/pixel | 1 |
| Checksum | 1 |
| Total | 179 |

Image Data

The format of the full-size and snapshot image data is either RADC- or ADPCM-compressed (as indicated by the camera firmware type in the Camera Status Block), in a format known to the host Image Processing Module. For communications purposes, the specific format information is implementation specific.

Commands

This table lists the commands that are recognized by digital camera. Each "#" represents a 16 bit pseudo-hex value. Complete descriptions are in the following subsections.

Throughout this section, "send" means to send data from the camera to the host, and "receive" means the camera is to receive data.

TABLE 12

Camera Commands

| Command | Description |
|---|---|
| ESC A# | Send single Image Status Block & thumbnail |
| ESC B# | Select Bit rate |
| ESC C# | Send Compressed image |
| ESC c##### | Send partial compressed image |
| ESC D | Receive firmware (valid only when camera is in ROM mode) |
| ESC E# | Erase images (last or all) |
| ESC I | Send image Inventory |
| ESC J | Send Contact Status Block |
| ESC N | Reset Camera |
| ESC O# | Select packet size(s) |
| ESC R | Switch to ROM mode (required before receive firmware commands) |
| ESC S | Send Camera Status Block |
| ESC T# | Take picture |
| ESC t## | Set camera time |
| ESC V# | Send table (camera matrix or compression table) |
| ESC W## | Set camera configuration |
| ESC Y | Wake Up camera |
| ESC Z### | Set camera identification number |
| ESC zAJST | Toggle Adjust mode |

ROM Mode:

When the camera is in ROM mode, only the ESC B #, ESC D, ESC 0, ESC S and ESC zAJST commands are recognized. For the ESC B # command, the only recognized bit rates are 9,600 and 57,600.

Adjust Mode:

When the camera is in Adjust mode, only the ESC ZAJST and ESC S commands are recognized. Other commands are optionally provided for manufacturing/diagnostic purposes.

Send Single Thumbnail (ESC A #)

The Send Single Thumbnail command allows a single preview to be selected for sending from the camera to the Host. 4 is in the range of I to the number of images currently stored in the camera ("N" field of the Camera Status Block).

Each thumbnail image is preceded by a 127 byte Image Status Block. The thumbnail data is 3,072 bytes, and in a format that is decoded by the host Image Processing Module.

6.2. Select Bit Rate (ESC B #)

The digital camera can communicate with the Host at a number of different speeds. The send and receive rates are preferably the same. The available settings are as shown in Table 13.

TABLE 13

| # (pseudo-hex) | Rate |
|---|---|
| 0000 | 9600 |
| 0001 . . 0007 | reserved |
| 0008 | 9600 |
| 0009 | reserved |
| 000: | 19200 |
| 000; | reserved |
| 000< | 38400 |
| 000= | 57600 |
| 000> | 115200 |
| 000? | 230400 |
| 0010 . . ???? | reserved |

In acknowledge mode, the camera will send an ACK at the rate at which it received the command. The camera will be ready to accept commands at the new rate 100 milliseconds after it has finished sending the ACK. If the # does not represent a valid rate, the camera will send a NAK and continue to use the "old" rate.

Send Compressed Image (ESC C #)

This command requests a compressed image from the camera. # is an image number in the range 1 to the number of images currently stored in the camera ("N" field of the Camera Status Block).

The size of the compressed image data can be obtained from the Image Status Block, as returned in response to the ESC I and ESC A # commands. The last block transferred is padded (i.e., filled beyond the end of the image data) with bytes of any value (i.e., it is the host application's responsibility to know the size).

Send Partial Compressed Image (ESC c # # # #)

This command requests a part of a compressed image from the camera. The first # is an image number in the range 1 to the number of images currently stored in the camera ("N" field of the Camera Status Block). The second and third #s are a 32 bit value indicating the starting position in the file, and the last two #s are a 32 bit value indicating the number of bytes of data to send (0XFFFFFFFF means to send the remainder of the image).

The size of the compressed image data can be obtained from the Image Status Block, as returned in response to the ESC I and ESC A # commands. The last block transferred is padded (i.e., filled beyond the end of the image data) with bytes of any value (i.e., it is the host application's responsibility to know the size).

Receive Firmware (ESC D)

Receiving firmware requires that the camera be switched to ROM mode first. The only operations possible for the camera in ROM mode are sending the Camera Status Block, setting the bit rate, changing the packet size, and receiving new firmware. The camera does not respond in any way to invalid commands received while in ROM mode.

After sending the ESC D command, the host preferably waits for an ACK from the camera before starting to send firmware. The firmware is preferably sent in 128-byte packets (127 bytes of data plus one byte checksum). The camera may respond with an ACK, NAK or CAN to each packet.

After receipt of the last (valid) packet, the camera will send an ACK and attempt to initialize and switch to RAM mode. When the switch to RAM mode is complete, the camera will send an EOT. If the initialization and switch to RAM mode fails, the camera will send a NAK and remain in ROM mode.

The digital camera will switch from ROM mode to RAM mode after the receipt of firmware has completed (unless the received firmware fails the validity checks after completion of the receive), or if the serial line is disconnected (or set to BREAK) before sending the first packet of the firmware. If the bit rate or packet size has been changed in ROM mode, the setting is returned when the camera switches back to RAM mode.

Erase Images (ESC E #)

This command is used to erase either the last image or all images from the camera. A # value of OXFFFF erases all images, OXOOOO erases the last image. The delete last command is only valid if the delete last mode is currently enabled (in the acknowledge response mode, the camera will NAK if the mode is not enabled). The delete all command is preferably allowed from the host, regardless of the camera mode setting.

When the camera is in acknowledge mode and does not contain any pictures, it will return a NAK to the command.

Send Image Inventory (ESC I)

When the image inventory is requested, the camera will send an Image Status Block and thumbnail (preview) for each image in the camera.

When retrieving an inventory of the images, the host application needs to use the number of active images from the camera returned in the Camera Status Block to know the number of packets that will be sent.

Each thumbnail image is preceded by a 127 byte Image Status Block. The thumbnail data is 3,072 bytes, and in a format that is decoded by the host Image Processing Module.

Send Contact Status Block (ESC J)

The Send Contact Status Block command provides a quick test for contact between the camera and the Host by sending a 15 byte block of data.

Reset Camera (ESC N)

The Reset Camera command sets all adjustable (via host software or the user interface) camera modes & settings to their default values. Table 14 shows the default setting for the camera.

TABLE 14

| Mode/Parmeter | Default |
| --- | --- |
| Sleep/Button timeout | 60 seconds |
| Response mode | mute |
| Exposure offset | 0 |
| Timer | off |
| Flash mode | auto |
| Button beep | on |
| Function beep | on |
| Delete Last mode | enabled* |
| Delete All mode | enabled* |
| Image resolution | full (768 × 512)* |

*Note that these parameters will only be switched to their defaults if there are no images in the camera.

These parameters will only be switched to their defaults if there are no images in the camera.

If the response mode is changed from mute to acknowledge by this command, the change becomes effective with the next command received (i.e., the camera will ACK the ESC N command, but not any subsequent commands).

The Configuration Code for the default values shown above is Ox3C3030FO (in pseudo-hex, "3<3030?0").

Select Packet Size (ESC 0#)

The digital camera firmware can send data in different packet sizes. # is a value in the range 0 to OxF. The following table gives the packet sizes for each setting.

The default packet size is 16. The camera will reset to the default size whenever it is disconnected from the host.

TABLE 15

| # (pseudo-hex) | Packet Size |
| --- | --- |
| 0000 | 16 |
| 0001 | 32 |
| 0002 | 64 |
| 0003 | 128 |
| 0004 | 256 |
| 0005 | 377 |
| 0006 | 497 |
| 0007 | 512 |
| 0008 | 1024 |
| 0009 .. ???? | reserved |

Switch to ROM Mode (ESC R)

This command switches the camera to ROM mode. It is used in conjunction with ESC D to receive new firmware.

In ROM mode, the only commands recognized by the camera are ESC S, ESC B #, ESC 0 # and ESC D.

Send Camera Status Block (ESC S)

The Camera Status Block is a 127-byte block of ASCII characters, consisting of strings separated by space characters. The block is padded with spaces to 127 bytes.

To guarantee compatibility with future versions of firmware, applications should not assume fixed lengths of the fields in the Camera Status Block. They should use the space character between fields as the only definitive field separator.

Take Picture (ESC T #)

This commands the digital camera to take a picture. It is the command equivalent of pressing the camera's trigger button. The only valid value for # is 0XFFFF.

The host first verifies that the camera is on and ready (via the Send Camera Status Block command) for this command to have any effect. When the camera is in acknowledge mode and it cannot take a picture (for any reason, including "camera full"), it will return a NAK to the command.

Set Camera Time (ESC t # #)

This command sends a 32 bit time value to set the camera's clock. The value is the number of seconds since a fixed arbitrary date, e.g., 00:00, Jan. 1, 1994.

Send Table (ESC V#)

This commands requests a table (or matrix) from the camera. The # parameter specifies which table should be returned.

TABLE 16

| # | Table type |
|---|---|
| 0 | reserved |
| 1 | Camera matrix |
| 2 | Compression tables |
| 3 .. 65535 | reserved |

Set Camera Configuration (ESC W # #)

This command sends a 32 bit configuration code bitset to the camera, to change operating modes, defaults, etc.

The presence of any invalid settings in the configuration code will cause the entire code to be ignored by the camera. If the camera is in Acknowledge mode, it will send a NAK.

If the bit that selects the response mode (mute/acknowledge) is changed, the change becomes effective with the next command received (i.e., if changing from acknowledge to mute mode, the camera will still ACK the ESC W # # command).

The camera image mode (high or low resolution) cannot be changed if the camera has pictures stored in it. When the camera is in acknowledge mode, an attempt to change the image mode of a nonempty camera will be considered invalid, and the camera will NAK the command.

Wake Up Camera (ESC Y)

This command causes the camera to wake up from sleep mode. When the camera is off, this command has no effect. It is useful if the host software wants to command the camera to take a picture, but the host first verifies (via the Send Camera Status Block command) that the camera is on (and asleep). After sending this command, the host then verifies that the camera is "ready" (as per the status) before commanding the camera to take a picture.

This command has no effect on the idle/active state of the camera's communication interface. If the interface is not active, the host preferably sends an additional character (usually ESC) to activate the interface before sending the command.

Set Camera Identification Number (ESC Z # #)

This command is used to set the camera ID that is returned in the "I" field of the Camera Status Block. The three #s are two 16-bit words of ID and 1 word of checksum. The checksum equals −(word 1+word2) (i.e., the negative of the sum), where the addition is performed without regard for carry overflow.

The most significant byte of the ID cannot actually be set via any command, but the correct value (as obtained from the Identification Number field of the Camera Status Block) is sent for a new ID to be accepted.

Toggle Camera Adjust Mode (ESC zAJST)

The adjust mode is reserved for use at the factory, and includes the commands to toggle in and out of adjust mode (ESC zAJST) and to send a Camera Status Block (ESC S). When the camera is in RAM or ROM mode and receives the ESC zAJST command, it will send an ACK, to indicate that it is entering the adjust mode. When the command is used to exit adjust mode, the camera will respond with EOT. The ACK and EOT signals are used regardless of the current response mode.

While the camera is in adjust mode, the data and command formats and the flow of control is considered undefined. The one exception to this is that the camera accepts another ESC zAJST command (to toggle out of adjust mode), and respond with an EOT, at whatever bit rate the camera was using before entering adjust mode (the bit rate may not be changed in adjust mode).

Theory Of Operation

The following sequence establishes connection and communication with the camera.

Reconnect

When first communicating with a camera it is advisable to (logically) disconnect and reconnect the camera by establishing a BREAK condition on the serial line. The BREAK should have a duration of at least 200 milliseconds.

The end of the BREAK appears to the camera as an initial connection to the host, and resets all camera communication parameters to their defaults. This leaves the camera waiting for commands at 9600 bps.

Send An ESC

The host should preferably send an ESC character at 9600 bps, because 9600 bps is the default bit rate for the digital camera.

This ESC should not be considered the first character of the first command to the camera.

Test Contact

Verify that communication has been established by sending an ESC J command. The ESC J command is preferred because it returns a short 15 byte block that will use only one 16 byte packet (the default packet size) and takes relatively little time to transmit and receive. As with all commands that return packets, an ACK should be sent to the camera if the contact block is received without error before sending further commands to the camera.

If the camera does not respond the host should try again, starting with sending a BREAK. Failure after two or three tries should be considered an indication that there is a problem with the physical connection between the camera and host, and calls for user intervention.

Get Camera Type, Etc.

At this point, you have established communication between the host and camera. It is advisable to use the ESC S command at this time to get a Camera Status Block and determine whether the camera is a digital camera (by the content of the "S" field), so that the host software can use appropriate commands when it is time to fetch images from the camera.

Once the host software has gotten this far, it can also change the baud rate and packet sizes to values best suited to the host system.

APPENDIX A

SPECIFICATION OF ONE EMBODIMENT OF THE DIGITAL CAMERA OF THE PRESENT INVENTION

By way of illustration, Appendix A shows the specification of one embodiment of the computer digital camera.

1. Features & Behaviors
1.1. Human Factors
   Weight: 1.5 lb. maximum, including batteries
   Size: Approximately L=150.5 mm, W=138.5 mm, H=55 mm.
   Shape: The camera is shaped like a binocular.
   Attachment: The camera is attached to the computer by means of an RS423 serial interface cable.
   Audio: The camera will provide the user with beep tones as appropriate. The sound making device will be located inside the camera at a location chosen to best transmit the sound to the user.
   LCD and Function Switches: The camera will have an ICON type LCD for status display and control. Three function switches will be used in conjunction with the LCD for control.
   On/Off Switch and Lens Cover: There will be a lens cover integrated with the camera on/off switch such that when the lens cover is less than fully open, the camera will be off.
1.2. Power Sources
   Camera power can be supplied by batteries or by an AC wall adapter.
   A backup battery for the clock will not be required. It is understood that the clock will continue to function for one minute without battery or AC adapter power. This will give the user the chance to replace the batteries without losing the clock settings.
1.2.1. AC Adapter
   The AC adapter will plug directly into the camera. When AC adaptor connector is mechanically plugged into the camera, the camera shall not use power from the batteries or require that batteries be 'alive' in order to function. If the AC adaptor is mechanically connected to the camera and no power is flowing through the adaptor (for example, the adaptor is not plugged into the wall), the camera will not operate. The camera has intelligent circuitry to determine whether the adaptor is plugged in and whether power is flowing through the adaptor.
   When the camera is running from the standard, supplied AC adapter there will not be enough current to provide for the same flash charge time as with fresh batteries.
   The AC connector on the battery packs will be of a standard for common AC adapters. This connector shall be capable of safely conducting the quantity of power required to "fast" cycle the flash.
   Different AC adapters will be provided on a country by country basis.
1.2.2. Battery details
   The camera will hold four "AA" batteries which will placed into the compartment located behind a door. It is found that the use of four batteries significantly and surprisingly extend the number of pictures the camera can take. The camera shall operate with NICAD, alkaline and lithium batteries.
   There will be information in the battery compartment which clearly shows the user the correct polarity placement of the batteries. The camera electronics shall be designed in such a way as not to be damaged if the user does place one or more batteries incorrectly.

1.3. Photographic Performance
1.3.1. Resolution
   In normal resolution mode, the camera takes color pictures with a resolution of 768 (w)×512 (h) picture elements.
   In snapshot mode the camera takes pictures with a resolution of 384(w) by 256 (h). Each picture element consists of 24 bits of color information after the raw data is decoded at the host computer.
1.3.2. Focus
   The camera is in focus from a distance of 4 ft. to infinity under all conditions. In this embodiment, the camera is "focus free"—the user does not not need to manually focus the camera.
1.3.3. Field of View
   The focal length of the camera's lens is such that the field of view is equivalent to using a 42 mm lens on a 35 mm camera.
1.3.4. Viewfinder
   The camera has an optical viewfinder which presents a correct view of the world. The viewfinder has forward-projected frame lines to show the actual picture area. The minimum eye relief shall be such that users with glasses can view the scene without difficulty, which implies a minimum eye relief of 15 mm.
1.3.5. Accessory Lenses
   There will advantageously be a 37 mm screw type adaptor for aftermarket video lenses. The ability to use aftermarket lens designed for video camera is one significant advantage of the present embodiment.
1.3.6. Exposure
   The camera's automatic exposure program varies the exposure time and lens aperture according to ambient lighting conditions.
   Shutter speeds are varied between $\frac{1}{30}$ and $\frac{1}{175}$ second; lens apertures are varied from f2.8 to f16. Maintaining a maximum-depth of field will be a priority in determining the exposure combination. The exposure program automatically activates the flash if it is required. Under most conditions, you do not need to adjust the camera exposure.
   An Exposure Override switch is provided for those circumstances where the picture needs to be lighter or darker than the automatic determination makes it. The override range is ±1 EV in 0.5 EV increments. Moving the switch in the "+" direction makes pictures lighter; moving the switch in the "−" direction makes pictures darker.
   The camera takes well color balanced pictures in ambient illumination ranging from high-level office florescent lighting to outdoor sun-on-snow. The target color temperature is 6000 degrees Kelvin for flash and 5500 degrees Kelvin for daylight. The camera ISO value is 84.
1.3.7. Flash
   The camera has a built-in xenon flash unit. The flash fires automatically when ambient light levels are too low for adequate exposure. The flash provides uniform coverage and produces consistent quality pictures from 4 ft. to 12 ft. The user will be provided with options to override in the automatic mode with the "always on" or "always off" modes.
   The exposure override feature will operate when the camera is in flash mode. It is understood that making use of this option may result in less than optimal pictures.
   The Flash Guide number is between 8 and 9. Because the camera has a non-standard ISO value, the guide number is not an exact integer.
   The flash unit will be designed in such a manner that in can be replaced by trained service personnel.
1.4. Electronic Performance
1.4.1. Electronic Connection Camera to Computer. The camera interfaces to the computer by means of a RS423 compatible serial interface. The camera will have a female mini-DIN connector for the camera to host serial interface cable. The female mini-DIN connector will be of a quality that will allow a minimum of 3,000 insertions without failure. Different cables with the appropriate host end connectors will be supplied for Macintosh and PC type computers. The camera shall be able to sustain a data transmission rate of 9.6 to 230 kb/sec.

1.4.2. Speed of Operation

The camera is capable of taking unflashed pictures at a maximum rate of one every five seconds and flashed pictures at a maximum rate of one every 8 seconds with fresh batteries. It is expected that the flash recycle time will increase to a maximum of 12 seconds when the camera is attached to the specified AC adapter.

1.4.3. Image Memory

The camera can be optionally built with 1M, 2M, 3M or 4M of internal image memory. Each 1M of image memory has capacity of 6 Normal or 26 Snapshot images. If the delete last image option is in use, the capacity per 1M is 5 Normal and 16 Snapshot. The image memory shall be nonvolatile in that power is not required to sustain the image data.

1.4.4. Battery Life

When using new Lithium cells, the camera shall be minimally capable of taking 800 flashed pictures over a period of 90 days.

1.4.5. Computer Control of Camera

The camera serial interface communications protocol will provide the host with the capability of controlling the camera. All the functions the user can perform from the camera control switches will be provided by the protocol. All status information available to user at the camera will be provided by the communications protocol.

In addition, the protocol will allow the host to:

Set the camera date and time.

Set the camera resolution mode.

Set the camera time to sleep interval.

Set the power up defaults for the various functions.

Enable/disable the picture delete functions.

1.5. Environmental/Reliability Conditions

The camera shall have a minimum useful life of 50,000 pictures. This figure does not include the flash tube which is limited to 3,000 flashes.

1.5.1. Electro-Static Discharge (ESD)

No Soft error up to 10 KV

No Hard Error up to 15 KV

No Failure up to 15 KV 1.6. Indicators, Displays, and Controls 1.6.1. Lens Cover and 1/0 Switch The moving lens cover will activate an On/Off switch. When the cover is fully opened the camera will be turned on. When the cover is less than fully opened the camera will be off. There will be non-electronic warning indicator in the view finder when the lens cover less than fully opened.

The camera must be turned on prior to taking pictures. It need not be on to communicate with the host.

The battery saver circuit turns the power off again if no pictures or function buttons have been taken for the set interval. This interval may be set from the host computer. The default interval is two minutes. The camera will remain in this sleep mode until any function button (but not the shutter button) is pressed at which time the camera will turn on. If the lens cover is moved from fully opened while in sleep mode, the camera will go into the off mode.

1.6.2. Indicator

The On/Off (Sleep) state is indicated by the LCD display of the picture count and battery level. When the camera is off or sleeping, these icons will not be visible.

1.6.3. Picture Button

The picture button is used to take a picture. It's just like the shutter button on a conventional camera. This button will be a one stage switch.

1.6.4. Function Buttons

There will be three function buttons used to control various functions of the camera in conjunction with the information on the LCD. The use of these buttons is detailed in the Koala User Interface Specification. The function buttons shall provide the user with tactile feedback upon switch closure.

1.6.5. Status and command LCD

The status of the battery and the number of remaining pictures will be shown on the LCD whenever the camera is on.

The user will be able to use the function keys and the LCD to:

Override the default exposure.

Set the flash mode to on, off and auto.

Set a timer for delayed shutter release.

Delete the last picture.

Delete all the pictures.

1.6.6. Camera/Flash Not Ready Indicator in Viewfinder

This LED type indicator shows red if either the camera is not ready to take a picture or the flash, if required, is not ready to fire. When all is ready, it is off. When a user takes a picture, the indicator goes from off to red to signify to the user that a picture has been taken.

APPENDIX B

Appendix B is the software prototype for one embodiment of the digital camera user interface illustrating, among other things, the cooperation between the tab button, plus and minus buttons, and the functions.

```
Begin Form UserFace
    BackColor       =   &H00C0C0C0&
    BorderStyle     =   1  'Fixed Single
    Caption         =   "Camera UserFace"
    ClientHeight    =   3615
    ClientLeft      =   1335
    ClientTop       =   1770
    ClientWidth     =   4590
    Height          =   4020
    Left            =   1275
    LinkTopic       =   "Form1"
    MaxButton       =   0  'False
    ScaleHeight     =   3615
    ScaleWidth      =   4590
    Top             =   1425
    Width           =   4710
    Begin CommandButton RechargeBut
        Caption     =   "Rec&harge"
        Height      =   435
        Left        =   315
        TabIndex    =   10
        Top         =   2835
        Width       =   1065
    End
    Begin CommandButton ResetBut
        Caption     =   "&Reset"
        Height      =   435
        Left        =   1785
        TabIndex    =   9
        Top         =   2835
        Width       =   1065
```

```
            End
            Begin CheckBox Check2
                BackColor       =   &H00C0C0C0&
                Caption         =   "Card inserted"
                Height          =   435
                Left            =   2730
                TabIndex        =   8
                Top             =   2100
                Width           =   1485
            End
            Begin CheckBox Check1
                BackColor       =   &H00C0C0C0&
                Caption         =   "Camera docked"
                Height          =   435
                Left            =   420
                TabIndex        =   7
                Top             =   2100
                Width           =   1695
            End
            Begin Timer SecsTimer
                Interval        =   333
                Left            =   3780
                Top             =   0
            End
            Begin Timer PollTimer
                Interval        =   100
                Left            =   3360
                Top             =   0
            End
            Begin CommandButton ShutterBut
                Caption         =   "&Shutter Button"
                Height          =   435
                Left            =   3045
                TabIndex        =   0
                Top             =   840
                Width           =   1395
            End
            Begin CommandButton QuitBut
```

```
                                        58
            Cancel          =   -1    'True
            Caption         =   "&Quit"
            Height          =   435
            Left            =   3255
            TabIndex        =   4
            TabStop         =   0     'False
            Top             =   2835
            Width           =   1065
         End
         Begin CommandButton CmdButMinus
            Caption         =   "-"
            FontBold        =   -1    'True
            FontItalic      =   0     'False
            FontName        =   "MS Sans Serif"
            FontSize        =   9.75
            FontStrikethru  =   0     'False
            FontUnderline   =   0     'False
            Height          =   360
            Left            =   1785
            TabIndex        =   3
            Top             =   1260
            Width           =   915
         End
         Begin CommandButton CmdButTab
            Caption         =   ">>"
            FontBold        =   -1    'True
            FontItalic      =   0     'False
            FontName        =   "MS Sans Serif"
            FontSize        =   9.75
30          FontStrikethru  =   0     'False
            FontUnderline   =   0     'False
            Height          =   360
            Left            =   1785
            TabIndex        =   2
            Top             =   420
            Width           =   915
         End
         Begin CommandButton CmdButPlus
```

```
           Caption          =   "+"
           FontBold         =   -1   'True
           FontItalic       =   0    'False
           FontName         =   "MS Sans Serif"
           FontSize         =   9.75
           FontStrikethru   =   0    'False
           FontUnderline    =   0    'False
           Height           =   360
           Left             =   1785
           TabIndex         =   1
           Top              =   840
           Width            =   915
        End
        Begin PictureBox Picture1
           Height           =   750
           Left             =   420
           ScaleHeight      =   48
           ScaleMode        =   0    'User
           ScaleWidth       =   72
           TabIndex         =   6
           TabStop          =   0    'False
           Top              =   630
           Width            =   1110
        End
        Begin Frame Frame1
           BackColor        =   &H00C0C0C0&
           Caption          =   "Camera ""Back"""
           Height           =   1680
           Left             =   240
           TabIndex         =   5
           Top              =   120
           Width            =   2610
        End
        Begin Line Line2
           X1               =   210
           X2               =   4410
           Y1               =   2625
           Y2               =   2625
```

```
            End
            Begin Line Line1
                X1              =   210
                X2              =   4410
                Y1              =   1995
                Y2              =   1995
            End
        End
    -------
    ' Copyright (c) Logitech, Inc. 1993
    '---------------------------------------------------------------
    --
    -------
    ' Author: Mark Lavelle
    '---------------------------------------------------------------
    --
    Option Explicit
    ' CONSTANTS
        ' general
    Const BLACK = &H0
    Const WHITE = &HFFFFFF
    Const TIMEOUT = 120 ' # of "seconds" idle before shutdown
    Const PIXTIME = 2
    Const XFERTIME = 2
    Const DELTIME = 2
    Const CARDMAX = 40
    Const WARNTIME = 16
    Const LOWBATT = 10
    Const MAXPHOTOS = 32
        ' icon/segment base positions (change here to change
        ' locations of icon sets)
    Const X0_CAM = 1, Y0_CAM = 0       ' CAMERA
    Const X0_FL = 19, Y0_FL = 0        ' FLASH
    Const X0_DLY = 37, Y0_DLY = 0      ' DELAY
    Const X0_BAT = 63, Y0_BAT = 0      ' BATTERY
    Const X0_EXP = 1, Y0_EXP = 17      ' EXPOSURE
```

```
    Const X0_DS = 1, Y0_DS = 32        ' DOCKING STATION
    Const X0_DLT = 19, Y0_DLT = 32     ' DELETE
    Const X0_EXC = 36, Y0_EXC = 34     ' EXCLAMATION POINT / WARNING
    Const X0_ROL = 41, Y0_ROL = 40     ' ROLL
    Const X0_01 = 62, Y0_01 = 32       ' UNITS
    Const X0_10 = 52, Y0_10 = 32       ' TENS
        ' icon states/attributes
    Const I_OFF = 0
    Const I_ON = 1
    Const I_INV = 2
    Const I_BLINK = 3
    Const I_INVBLINK = 4
        ' display/function states
    Const SEL_CAM = 1
    Const SEL_FLASH = 2
    Const SEL_DELAY = 3
    Const SEL_EXP = 4
    Const SEL_DOCK = 5
    Const SEL_DELETE = 6
    Const SEL_FIRST = SEL_CAM
    Const SEL_LAST = SEL_DELETE
        ' flash modes
    Const FL_OFF = 0
    Const FL_AUTO = 1
    Const FL_ON = 2
        ' delete modes
    Const DEL_OFF = 0
    Const DEL_ONE = 1
    Const DEL_ALL = 2
        ' command buttons
    Const CMD_OFF = 0
    Const CMD_TAB = 1
    Const CMD_PLUS = 2
    Const CMD_MINUS = 3
        ' icon segments
    Const S_CAMERA = 0
    Const S_FLASH = 1
    Const S_DELAY = 2
```

```
    Const S_BATT = 3
    Const S_CARD = 4
    Const S_DELETE = 5
    Const S_WARN = 6
    ' VARIABLES
        ' integers
    Dim Shared NDelete, NCopy, NumPhotos, NBlinks, NToCard As
    Integer
    Dim Shared CmdButton, ShutterButton, TopSel, MenuLevel As
    Integer
    Dim Shared FlashMode, BattLevel, ExpOffset, DelMode, Delay As
    Integer
    Dim Shared SysSecs, TimeoutSecs, DeltaSecs As Integer
        ' booleans
    Dim Shared DSAttached, CardReady, CardFull, CameraOn, TabsOn,
    Tick Sub Check1_Click ()
        If Check1.Value = 0 Then
            DSAttached = False
        Else
            DSAttached = True
        End If
        If CameraOn Then reCard
        'If CameraOn And MenuLevel = 0 Then reCard
    End Sub Sub Check2_Click ()
        If Check2.Value = 0 Then
            CardReady = False
        Else
            CardReady = True
            NCopy = -1
            NToCard = 0
            CardFull = False
        End If
        If CameraOn Then reCard
        'If CameraOn And MenuLevel = 0 Then reCard
```

```
    End Sub

Sub clearLCD ()
        segCamera (I_OFF)
        seg01A (I_OFF): seg01B (I_OFF): seg01C (I_OFF): seg01D
    (I_OFF): seg01E (I_OFF): seg01F (I_OFF): seg01G (I_OFF)
        seg10A (I_OFF): seg10B (I_OFF): seg10C (I_OFF): seg10D
    (I_OFF): seg10E (I_OFF): seg10F (I_OFF): seg10G (I_OFF)
        segBatt (I_OFF): segBattTop (I_OFF): segBattHigh (I_OFF):
    segBattMid (I_OFF): segBattLow (I_OFF)
        segWarn (I_OFF)
        segDelete (I_OFF)
        segDelay (I_OFF): segDelay10 (I_OFF): segDelay30 (I_OFF)
        segExpBar (I_OFF): segExpAuto (I_OFF)
        segExpSub2 (I_OFF): segExpSub1 (I_OFF)
        segExpPlus1 (I_OFF): segExpPlus2 (I_OFF)
        segFlash (I_OFF): segFlashSlash (I_OFF): segFlashCirc
    (I_OFF)
        segRoll (I_OFF)
        segToCard (I_OFF)
        segSelCamera (I_OFF)
        segSelCard (I_OFF)
        segSelDelay (I_OFF)
        segSelDelete (I_OFF)
        segSelExp (I_OFF)
        segSelFlash (I_OFF)
    End Sub Sub CmdButMinus_Click ()
        CmdButton = CMD_MINUS
        TimeoutSecs = 0
    End Sub Sub CmdButPlus_Click ()
        CmdButton = CMD_PLUS
        TimeoutSecs = 0
    End Sub
```

```
    Sub CmdButTab_Click ()
        CmdButton = CMD_TAB
        TimeoutSecs = 0
    End Sub Sub doCmdMinus ()

If MenuLevel = 0 Then
            Select Case TopSel
            'Case SEL_CAM          ' turn off camera
            '    If CameraOn Then
            '        CameraOn = False
            '        clearLCD
            '    End If Case SEL_FLASH         ' cycle flash mode
                Select Case FlashMode
                Case FL_OFF
                    FlashMode = FL_ON
                Case FL_AUTO
                    FlashMode = FL_OFF
                Case FL_ON
                    FlashMode = FL_AUTO
                End Select ' FlashMode
                reFlash Case SEL_DELAY         ' cycle delay time - resets to 0 after shooting
                Select Case Delay
                Case 0
                    Delay = 30
                Case 10
                    Delay = 0
                Case 30
                    Delay = 10
                End Select
                reDelay
```

```
        Case SEL_EXP          ' cycle exposure offset - resets on
    power down
            If ExpOffset = -2 Then
                ExpOffset = 2
            Else
                ExpOffset = ExpOffset - 1
            End If
            reExp
        End Select ' TopSel Else ' MenuLevel <> 0

        MenuLevel = 0
        reDelete

End If ' MenuLevel = 0

    TimeoutSecs = 0

End Sub

Sub doCmdPlus ()
    Dim i As Integer

If MenuLevel = 0 Then

Select Case TopSel
30      Case SEL_CAM          ' turn off camera
            If CameraOn Then
                CameraOn = False
                clearLCD
                NDelete = -1
            End If Case SEL_FLASH        ' cycle flash mode
            Select Case FlashMode
```

```
              Case FL_OFF
                  FlashMode = FL_AUTO
              Case FL_AUTO
                  FlashMode = FL_ON
              Case FL_ON
                  FlashMode = FL_OFF
              End Select ' FlashMode
              reFlash 10        Case SEL_DELAY        ' cycle delay time - resets to 0
   after
   shooting
              Select Case Delay
              Case 0
                  Delay = 10
              Case 10
                  Delay = 30
              Case 30
                  Delay = 0
              End Select
              reDelay Case SEL_EXP          ' cycle exposure offset - resets on
   power down
25            If ExpOffset = 2 Then
                  ExpOffset = -2
              Else
                  ExpOffset = ExpOffset + 1
              End If
              reExp Case SEL_DOCK  ' MOVE TO CARD
              If CardFull Then ' show warning
                  NBlinks = WARNTIME
                  waitBlink (S_WARN)
                  segWarn (I_OFF)
              Else ' NOT CardFull
                  If NumPhotos > 0 Then
```

```
                    NBlinks = XFERTIME
                    showNumber (MAXPHOTOS - NumPhotos)
                    For i = NumPhotos To 1 Step -1
                        waitBlink (S_CARD)
                        NumPhotos = NumPhotos - 1
                        NToCard = NToCard + 1
                        showNumber (MAXPHOTOS - NumPhotos)
                        If NToCard > CARDMAX Then
                            CardFull = True
                            Exit For
                        End If
                    Next i
                    If CardFull And (i <> 0) Then ' can't move some
                        Beep
                        NBlinks = WARNTIME
                        waitBlink (S_WARN)
                        segWarn (I_OFF)
                    Else ' moved all pix
                        NDelete = -1
                        reDelete
                    End If ' card full
                Else ' NPhotos = 0
                    Beep
                End If
            End If ' CardFull Case SEL_DELETE
                If NumPhotos > 0 And NDelete = 0 Then
                    MenuLevel = 1
                    segWarn (I_ON)
                Else ' no pix - error
                    Beep
                End If
            End Select ' TopSel ElseIf MenuLevel = 1 Then
```

```
            If TopSel = SEL_DELETE Then   ' go ahead with delete
                NBlinks = DELTIME
                waitBlink (S_DELETE)
                NDelete = 1
                reDelete
                NumPhotos = NumPhotos - 1
                showNumber (MAXPHOTOS - NumPhotos)
            Else              ' shouldn't get here, but let's be
      safe...
                segWarn (I_OFF)
            End If
            MenuLevel = 0
            rePaint
        Else ' MenuLevel <> (0 or 1)

rePaint

End If ' MenuLevel = 0
        TimeoutSecs = 0

End Sub

    Sub doCmdTab ()

If BattLevel > LOWBATT Then
            If TopSel = SEL_LAST Then
                TopSel = SEL_FIRST
            Else TopSel = TopSel + 1
            End If
            If (TopSel = SEL_DOCK) And (CardFull Or (Not (DSAttached
    And CardReady))) Then
                TopSel = TopSel + 1
            End If
            If TopSel = SEL_DELETE And NDelete <> 0 Then
                TopSel = SEL_FIRST
            End If
```

```
            If MenuLevel <> 0 Then ' Tabbed out of a delete
                MenuLevel = 0
                reDelete
            End If
        Else
            Select Case TopSel
            Case SEL_CAM
                If DSAttached And CardReady And Not CardFull Then TopSel
    = SEL_DOCK
            Case Else
                TopSel = SEL_CAM
            End Select
        End If
        reSelect
        TimeoutSecs = 0

End Sub
    Sub doCommand ()

If Not CameraOn And CmdButton <> CMD_OFF Then ' wake up
            CameraOn = True
            MenuLevel = 0
            TopSel =. SEL_CAM
            FlashMode = FL_AUTO
            Delay = 0
            ExpOffset = 0
            rePaint
            NDelete = -1
            NCopy = -1
        Else ' camera already on
            Select Case CmdButton
            Case CMD_TAB
                doCmdTab
            Case CMD_PLUS
                doCmdPlus
```

```
              Case CMD_MINUS
                  doCmdMinus
              Case Else
              End Select
         End If ' Not CameraOn...

CmdButton = CMD_OFF ' turn off button

End Sub
     Sub doShutter ()
     Dim i As Integer

If NumPhotos < MAXPHOTOS And BattLevel > LOWBATT Then ' do
     wait, ready, increment NumPhotos ' check if delay active
             If Delay <> 0 Then
                 NBlinks = Delay
                 waitBlink (S_DELAY)
                 Beep
             End If
             ' fake expose & process time
             NBlinks = PIXTIME
             waitBlink (S_CAMERA)
             Beep
             If BattLevel > 3 Then
                 BattLevel = BattLevel - 3
             End If ' batt > 3
             ' incr. NumPhotos
             NumPhotos = NumPhotos + 1
             NDelete = 0 ' delete last OK
             reDelete
         Else ' out-of-film or low battery If NumPhotos >= MAXPHOTOS Then ' out of film  - 2 beeps
                 For i = 1 To 20000
```

```
            Next i
            Beep
            For i = 1 To 20000
            Next i
            Beep
         Else ' low battery - 3 beeps
            For i = 1 To 20000
            Next i
            Beep
10          For i = 1 To 20000
            Next i
            Beep
            For i = 1 To 20000
            Next i
            Beep
            NBlinks = WARNTIME
            waitBlink (S_BATT)
            reSelect
         End If ' NumPhotos >= 32
      End If ' ok to shoot ShutterButton = 0 ' turn off button
      'segRoll (I_ON)
      showNumber (MAXPHOTOS - NumPhotos)
      reBatt    ' re-display battery level
      MenuLevel = 0
      If Delay <> 0 Then
         Delay = 0
         reDelay
      End If If Not CameraOn Then   ' were we asleep?
         CameraOn = True
         rePaint
      End If If BattLevel <= LOWBATT Then rePaint
```

```
    End Sub

Sub Form_Load ()
        CmdButton = CMD_OFF
        ShutterButton = 0
        MenuLevel = 0
        NumPhotos = 0
        CameraOn = True
        DSAttached = False
        CardReady = False
        TopSel = SEL_CAM
        FlashMode = FL_AUTO
        Delay = 0
        BattLevel = 99
        ExpOffset = 0
        NDelete = -1
        NCopy = -1
        SysSecs = 0
        DeltaSecs = 0
        TimeoutSecs = 0
        NToCard = 0
        CardFull = False
    End Sub
    Sub Form_Paint ()
        rePaint
    End Sub Sub PollTimer_Timer ()
    ' act like we're polling the buttons on the camera...

If ShutterButton = 1 Then ' take a "picture"
            doShutter
        Else ' not ShutterButton, so check CmdButtons
            doCommand
        End If ' ShutterButton End Sub
```

```
    Sub QuitBut_Click ()
        End
    End Sub

   Sub reBatt ()

segBatt (I_ON)
        Select Case BattLevel
        Case Is > 75
            segBattTop (I_ON)
            segBattHigh (I_ON)
            segBattMid (I_ON)
            segBattLow (I_ON)
        Case Is > 50
            segBattTop (I_OFF)
            segBattHigh (I_ON)
            segBattMid (I_ON)
            segBattLow (I_ON)
        Case Is > 25
            segBattTop (I_OFF)
            segBattHigh (I_OFF)
            segBattMid (I_ON)
            segBattLow (I_ON)
        Case Is > 10
            segBattTop (I_OFF)
            segBattHigh (I_OFF)
            segBattMid (I_OFF)
            segBattLow (I_ON)
        Case Else
            segBattTop (I_OFF)
            segBattHigh (I_OFF)
            segBattMid (I_OFF)
            segBattLow (I_OFF)
        End Select
    End Sub Sub reCard ()
```

```
        If DSAttached And CardReady And Not CardFull And BattLevel >
    0
    Then
            segToCard (I_ON)
        Else ' can't use PC Card
            segToCard (I_OFF)
            If TopSel = SEL_DOCK Then
                TopSel = SEL_CAM
                reSelect
            End If
        End If End Sub
    Sub RechargeBut_Click ()
        BattLevel = 99
        reBatt
        TimeoutSecs = 0
        rePaint
    End Sub Sub reDelay ()

If BattLevel > LOWBATT Then
            segDelay (I_ON)
            Select Case Delay
            Case 10
                segDelay10 (I_ON)
                segDelay30 (I_OFF)
            Case 30
                segDelay10 (I_OFF)
                segDelay30 (I_ON)
            Case Else
                segDelay10 (I_OFF)
                segDelay30 (I_OFF)
            End Select
        Else
            segDelay (I_OFF)
```

```
              segDelay10 (I_OFF)
              segDelay30 (I_OFF)
          End If
    End Sub Sub reDelete ()

If BattLevel > LOWBATT And NDelete = 0 Then
             segDelete (I_ON)
             segWarn (I_OFF)
             If MenuLevel <> 0 And NDelete = 0 Then
                 If MenuLevel = 1 Then segWarn (I_ON)
             End If
         Else
             segDelete (I_OFF)
             segWarn (I_OFF)
             If TopSel = SEL_DELETE Then
                 TopSel = SEL_CAM
                 reSelect
             End If
         End If End Sub
     Sub reExp ()

If BattLevel > LOWBATT Then
             segExpBar (I_ON)
             segExpSub2 (I_OFF)
             segExpSub1 (I_OFF)
             segExpAuto (I_OFF)
             segExpPlus1 (I_OFF)
             segExpPlus2 (I_OFF)
             Select Case ExpOffset
             Case -2
                 segExpSub2 (I_ON)
             Case -1
```

```
               segExpSub1 (I_ON)
           Case 0
               segExpAuto (I_ON)
           Case 1
               segExpPlus1 (I_ON)
           Case 2
               segExpPlus2 (I_ON)
           End Select
       Else
           segExpBar (I_OFF)
           segExpSub2 (I_OFF)
           segExpSub1 (I_OFF)
           segExpAuto (I_OFF)
           segExpPlus1 (I_OFF)
           segExpPlus2 (I_OFF)
       End If End Sub Sub reFlash ()

If BattLevel > LOWBATT Then
           segFlash (I_ON)           ' flash icon
           segFlashCirc (I_OFF)
           segFlashSlash (I_OFF)
           Select Case FlashMode
           Case FL_OFF
               segFlashCirc (I_ON)
               segFlashSlash (I_ON)
           Case FL_ON
               segFlashCirc (I_ON)
           Case Else
               FlashMode = FL_AUTO
           End Select
       Else
           segFlash (I_OFF)
           segFlashCirc (I_OFF)
           segFlashSlash (I_OFF)
```

```
            End If

End Sub

     Sub rePaint ()

segCamera (I_ON)

reFlash
            reDelay
            reBatt
            reExp
            reCard
            reDelete
            If MenuLevel = 0 Then
                segRoll (I_ON)
                showNumber (MAXPHOTOS - NumPhotos)
            End If
            reSelect  ' draw box around current selection End Sub
      Sub reSelect ()

segSelFlash (I_OFF)
            segSelCard (I_OFF)
            segSelExp (I_OFF)
            segSelDelay (I_OFF)
            segSelDelete (I_OFF)
            segSelCamera (I_OFF)
            If BattLevel > LOWBATT Then
                Select Case TopSel
                Case SEL_CAM
                    segSelCamera (I_ON)
                Case SEL_FLASH
                    segSelFlash (I_ON)
```

```
                Case SEL_DOCK
                    segSelCard (I_ON)
                Case SEL_EXP
                    segSelExp (I_ON)
                Case SEL_DELAY
                    segSelDelay (I_ON)
                Case SEL_DELETE
                    segSelDelete (I_ON)
                Case Else
                    TopSel = 0   ' temp - to look for holes in logic
                End Select
            Else ' battery is low
                Select Case TopSel
                Case SEL_CAM
                    segSelCamera (I_ON)
                Case SEL_FLASH, SEL_DELAY, SEL_EXP, SEL_DELETE
                    segSelCamera (I_ON)
                    TopSel = SEL_CAM
                Case SEL_DOCK
                    segSelCard (I_ON)
                Case Else
                    TopSel = 0   ' temp - to look for holes in logic
                End Select
            End If
    End Sub Sub ResetBut_Click ()
        Form_Load
        Check1.Value = 0
        Check2.Value = 0
        rePaint
        TimeoutSecs = 0
        NCopy = -1
        NToCard = 0
        CardFull = False
    End Sub
```

```
    Sub SecsTimer_Timer ()

Tick = True
        SysSecs = SysSecs + 1
        DeltaSecs = DeltaSecs + 1
        '!! DISABLE TIMEOUT FOR INTERVIEW SESSIONS
        '!! TimeoutSecs = TimeoutSecs + 1
        If TimeoutSecs > TIMEOUT Then
            CameraOn = False
            clearLCD
            ' and reset anything that needs to go back to its default
            ExpOffset = 0
            FlashMode = FL_AUTO
            Delay = 0
            NDelete = -1
            NCopy = -1
        End If End Sub
    Sub seg01A (status)

Dim X, Y As Integer
        Dim Color As Long
25      Const X0 = X0_01, Y0 = Y0_01

If status = I_OFF Then
            Color = WHITE
        Else Color = BLACK
30      End If For X = X0 + 1 To X0 + 6
            Picture1.PSet (X, Y0), Color
        Next X
35
        For X = X0 + 2 To X0 + 5
            Picture1.PSet (X, Y0 + 1), Color
        Next X
```

```
    End Sub

Sub seg01B (status)

       Dim X, Y As Integer
        Dim Color As Long
        Const X0 = X0_01, Y0 = Y0_01

If status = I_OFF Then
10          Color = WHITE
        Else Color = BLACK
        End If For X = X0 To X0 + 1
15          For Y = Y0 + 1 To Y0 + 6
                Picture1.PSet (X, Y), Color
            Next Y
        Next X 20      Picture1.PSet (X0, Y0 + 7), Color End Sub Sub seg01C (status)
        Dim X, Y As Integer
        Dim Color As Long
        Const X0 = X0_01, Y0 = Y0_01

30      If status = I_OFF Then
            Color = WHITE
        Else Color = BLACK
        End If 35      For X = X0 + 6 To X0 + 7
            For Y = Y0 + 1 To Y0 + 6
                Picture1.PSet (X, Y), Color
            Next Y
```

```
            Next X

Picture1.PSet (X0 + 7, Y0 + 7), Color

       End Sub

Sub seg01D (status)

Dim X, Y As Integer
            Dim Color As Long
            Const X0 = X0_01, Y0 = Y0_01

If status = I_OFF Then
                Color = WHITE
15          Else Color = BLACK
            End If For X = X0 + 1 To X0 + 6
                For Y = Y0 + 7 To Y0 + 8
20                  Picture1.PSet (X, Y), Color
                Next Y
            Next X End Sub
        Sub seg01E (status)

Dim X, Y As Integer
            Dim Color As Long
30          Const X0 = X0_01, Y0 = Y0_01

If status = I_OFF Then
                Color = WHITE
            Else Color = BLACK
            End If Picture1.PSet (X0, Y0 + 8), Color
```

```
        For X = X0 To X0 + 1
           For Y = Y0 + 9 To Y0 + 14
              Picture1.PSet (X, Y), Color
           Next Y
        Next X End Sub Sub seg01F (status)

Dim X, Y As Integer
        Dim Color As Long
        Const X0 = X0_01, Y0 = Y0_01

If status = I_OFF Then
           Color = WHITE
        Else Color = BLACK
        End If Picture1.PSet (X0 + 7, Y0 + 8), Color For X = X0 + 6 To X0 + 7
           For Y = Y0 + 9 To Y0 + 14
              Picture1.PSet (X, Y), Color
           Next Y
        Next X End Sub Sub seg01G (status)

Dim X, Y As Integer
        Dim Color As Long
        Const X0 = X0_01, Y0 = Y0_01

If status = I_OFF Then
           Color = WHITE
        Else Color = BLACK
```

```
        End If

For X = X0 + 2 To X0 + 5
            Picture1.PSet (X, Y0 + 14), Color
        Next X For X = X0 + 1 To X0 + 6
            Picture1.PSet (X, Y0 + 15), Color
        Next X End Sub Sub seg10A (status)

Dim X, Y As Integer
        Dim Color As Long
        Const X0 = X0_10, Y0 = Y0_10

If status = I_OFF Then
            Color = WHITE
        Else Color = BLACK
        End If For X = X0 + 1 To X0 + 6
            Picture1.PSet (X, Y0), Color
        Next X For X = X0 + 2 To X0 + 5
            Picture1.PSet (X, Y0 + 1), Color
        Next X End Sub Sub seg10B (status)

Dim X, Y As Integer
        Dim Color As Long
        Const X0 = X0_10, Y0 = Y0_10
```

```
        If status = I_OFF Then
            Color = WHITE
        Else Color = BLACK
5       End If For X = X0 To X0 + 1
            For Y = Y0 + 1 To Y0 + 6
                Picture1.PSet (X, Y), Color
10          Next Y
        Next X Picture1.PSet (X0, Y0 + 7), Color
    End Sub Sub seg10C (status)

Dim X, Y As Integer
        Dim Color As Long
        Const X0 = X0_10, Y0 = Y0_10

If status = I_OFF Then
            Color = WHITE
25      Else Color = BLACK
        End If For X = X0 + 6 To X0 + 7
            For Y = Y0 + 1 To Y0 + 6
30              Picture1.PSet (X, Y), Color
            Next Y
        Next X Picture1.PSet (X0 + 7, Y0 + 7), Color
    End Sub Sub seg10D (status)
```

```
        Dim X, Y As Integer
        Dim Color As Long
        Const X0 = X0_10, Y0 = Y0_10

5       If status = I_OFF Then
            Color = WHITE
        Else Color = BLACK
        End If 10      For X = X0 + 1 To X0 + 6
            For Y = Y0 + 7 To Y0 + 8
                Picture1.PSet (X, Y), Color
            Next Y
        Next X
15
    End Sub Sub seg10E (status)

20      Dim X, Y As Integer
        Dim Color As Long
        Const X0 = X0_10, Y0 = Y0_10

If status = I_OFF Then
25          Color = WHITE
        Else Color = BLACK
        End If Picture1.PSet (X0, Y0 + 8), Color
30
        For X = X0 To X0 + 1
            For Y = Y0 + 9 To Y0 + 14
                Picture1.PSet (X, Y), Color
            Next Y
        Next X End Sub
```

```
    Sub seg10F (status)

Dim X, Y As Integer
        Dim Color As Long
5       Const X0 = X0_10, Y0 = Y0_10

If status = I_OFF Then
            Color = WHITE
        Else Color = BLACK
10      End If Picture1.PSet (X0 + 7, Y0 + 8), Color For X = X0 + 6 To X0 + 7
15          For Y = Y0 + 9 To Y0 + 14
                Picture1.PSet (X, Y), Color
            Next Y
        Next X
    End Sub Sub seg10G (status)

Dim X, Y As Integer
        Dim Color As Long
        Const X0 = X0_10, Y0 = Y0_10

If status = I_OFF Then
            Color = WHITE
30      Else Color = BLACK
        End If For X = X0 + 2 To X0 + 5
            Picture1.PSet (X, Y0 + 14), Color
35      Next X For X = X0 + 1 To X0 + 6
            Picture1.PSet (X, Y0 + 15), Color
```

```
        Next X

End Sub

   Sub segBatt (status)

Dim X, Y As Integer
        Dim Color As Long
        Const X0 = X0_BAT, Y0 = Y0_BAT
10
        If status = I_OFF Then
            Color = WHITE
        Else Color = BLACK
        End If
        Picture1.PSet (X0 + 2, Y0 + 1), Color
        Picture1.PSet (X0 + 3, Y0 + 1), Color For X = X0 To X0 + 5
            Picture1.PSet (X, Y0 + 2), Color
        Next X
        For Y = Y0 + 3 To Y0 + 14
            Picture1.PSet (X0, Y), Color
        Next Y
        For Y = Y0 + 3 To Y0 + 14
            Picture1.PSet (X0 + 5, Y), Color
        Next Y
        For X = X0 To X0 + 5
            Picture1.PSet (X, Y0 + 15), Color
        Next X End Sub Sub segBattHigh (status)
        Dim X, Y As Integer
        Dim Color As Long
        Const X0 = X0_BAT, Y0 = Y0_BAT
```

```
        If status = I_OFF Then
           Color = WHITE
        Else Color = BLACK
        End If For X = X0 + 1 To X0 + 4
           For Y = Y0 + 6 To Y0 + 8
              Picture1.PSet (X, Y), Color
           Next Y
        Next X End Sub
     Sub segBattLow (status)

Dim X, Y As Integer
        Dim Color As Long
        Const X0 = X0_BAT, Y0 = Y0_BAT
20
        If status = I_OFF Then
           Color = WHITE
        Else Color = BLACK
        End If
        For X = X0 + 1 To X0 + 4
           For Y = Y0 + 12 To Y0 + 14
              Picture1.PSet (X, Y), Color
           Next Y
        Next X End Sub Sub segBattMid (status)
        Dim X, Y As Integer
        Dim Color As Long
        Const X0 = X0_BAT, Y0 = Y0_BAT
```

```
        If status = I_OFF Then
            Color = WHITE
        Else Color = BLACK
        End If For X = X0 + 1 To X0 + 4
            For Y = Y0 + 9 To Y0 + 11
                Picture1.PSet (X, Y), Color
            Next Y
        Next X End Sub
    Sub segBattTop (status)

Dim X, Y As Integer
        Dim Color As Long
        Const X0 = X0_BAT, Y0 = Y0_BAT
20
        If status = I_OFF Then
            Color = WHITE
        Else Color = BLACK
        End If
        For X = X0 + 1 To X0 + 4
            For Y = Y0 + 3 To Y0 + 5
                Picture1.PSet (X, Y), Color
            Next Y
        Next X End Sub Sub segCamera (status)
        Dim X, Y As Integer
        Dim Color As Long
        Const X0 = X0_CAM, Y0 = Y0_CAM
```

```
         If status = I_OFF Then
            Color = WHITE
         Else Color = BLACK
         End If For X = X0 + 3 To X0 + 6
            Picture1.PSet (X, Y0 + 4), Color
         Next X
         For X = X0 + 2 To X0 + 14
            For Y = Y0 + 5 To Y0 + 6
               Picture1.PSet (X, Y), Color
            Next Y
         Next X
         Picture1.PSet (X0 + 1, Y0 + 6), Color
         For X = X0 + 1 To X0 + 3
            Picture1.PSet (X, Y0 + 7), Color
         Next X
         For X = X0 + 6 To X0 + 8
            Picture1.PSet (X, Y0 + 7), Color
         Next X
         Picture1.PSet (X0 + 11, Y0 + 7), Color
         Picture1.PSet (X0 + 14, Y0 + 7), Color
         For X = X0 + 1 To X0 + 3
            Picture1.PSet (X, Y0 + 8), Color
         Next X
         For X = X0 + 6 To X0 + 14
            Picture1.PSet (X, Y0 + 8), Color
         Next X
         For X = X0 + 1 To X0 + 14
            Picture1.PSet (X, Y0 + 9), Color
         Next X
         For X = X0 + 2 To X0 + 7
            Picture1.PSet (X, Y0 + 10), Color
         Next X
         For X = X0 + 3 To X0 + 6
            Picture1.PSet (X, Y0 + 11), Color
         Next X
```

```
    End Sub

Sub segDelay (status)

       Dim X, Y As Integer
       Dim Color As Long
       Const X0 = X0_DLY, Y0 = Y0_DLY If status = I_OFF Then
10         Color = WHITE
       Else Color = BLACK
       End If For X = X0 + 7 To X0 + 8
           For Y = Y0 + 1 To Y0 + 3
               Picture1.PSet (X, Y), Color
           Next Y
       Next X
       Picture1.PSet (X0 + 10, Y0 + 2), Color
       Picture1.PSet (X0 + 11, Y0 + 2), Color
       Picture1.PSet (X0 + 12, Y0 + 3), Color
       Picture1.PSet (X0 + 13, Y0 + 4), Color
       Picture1.PSet (X0 + 13, Y0 + 5), Color
       Picture1.PSet (X0 + 14, Y0 + 6), Color
       Picture1.PSet (X0 + 14, Y0 + 7), Color
       Picture1.PSet (X0 + 14, Y0 + 8), Color
       Picture1.PSet (X0 + 14, Y0 + 9), Color
       Picture1.PSet (X0 + 13, Y0 + 10), Color
       Picture1.PSet (X0 + 13, Y0 + 11), Color
       Picture1.PSet (X0 + 12, Y0 + 12), Color
       Picture1.PSet (X0 + 11, Y0 + 13), Color
       Picture1.PSet (X0 + 10, Y0 + 13), Color
       Picture1.PSet (X0 + 9, Y0 + 14), Color
       Picture1.PSet (X0 + 8, Y0 + 14), Color
       Picture1.PSet (X0 + 7, Y0 + 14), Color
       Picture1.PSet (X0 + 6, Y0 + 14), Color
       Picture1.PSet (X0 + 5, Y0 + 13), Color
       Picture1.PSet (X0 + 4, Y0 + 13), Color
```

```
        Picture1.PSet (X0 + 3, Y0 + 12), Color
        Picture1.PSet (X0 + 2, Y0 + 11), Color
        Picture1.PSet (X0 + 2, Y0 + 10), Color
        Picture1.PSet (X0 + 1, Y0 + 9), Color
        Picture1.PSet (X0 + 1, Y0 + 8), Color
        Picture1.PSet (X0 + 1, Y0 + 7), Color
        Picture1.PSet (X0 + 1, Y0 + 6), Color
        Picture1.PSet (X0 + 2, Y0 + 5), Color
        Picture1.PSet (X0 + 2, Y0 + 4), Color
        Picture1.PSet (X0 + 2, Y0 + 2), Color
        Picture1.PSet (X0 + 3, Y0 + 3), Color
        Picture1.PSet (X0 + 4, Y0 + 4), Color
        Picture1.PSet (X0 + 5, Y0 + 5), Color
        Picture1.PSet (X0 + 6, Y0 + 6), Color
        For X = X0 + 7 To X0 + 8
            For Y = Y0 + 7 To Y0 + 8
                Picture1.PSet (X, Y), Color
            Next Y
        Next X
    End Sub Sub segDelay10 (status)

    Dim X, Y As Integer
    Dim Color As Long
    Const X0 = X0_DLY, Y0 = Y0_DLY If status = I_OFF Then
30      Color = WHITE
    Else Color = BLACK
    End If For Y = Y0 + 4 To Y0 + 8             ' 1
        Picture1.PSet (X0 + 18, Y), Color
    Next Y For Y = Y0 + 4 To Y0 + 8             ' 0
```

```
            Picture1.PSet (X0 + 21, Y), Color
        Next Y
            Picture1.PSet (X0 + 22, Y0 + 4), Color
            Picture1.PSet (X0 + 22, Y0 + 8), Color
        For Y = Y0 + 4 To Y0 + 8
            Picture1.PSet (X0 + 23, Y), Color
        Next Y End Sub
    Sub segDelay30 (status)

Dim X, Y As Integer
        Dim Color As Long
15      Const X0 = X0_DLY, Y0 = Y0_DLY If status = I_OFF Then
            Color = WHITE
        Else Color = BLACK
        End If For X = X0 + 17 To X0 + 18              ' 3
            Picture1.PSet (X, Y0 + 10), Color
        Next X
        For X = X0 + 17 To X0 + 18
            Picture1.PSet (X, Y0 + 12), Color
        Next X
        For X = X0 + 17 To X0 + 18
            Picture1.PSet (X, Y0 + 14), Color
        Next X
        For Y = Y0 + 10 To Y0 + 14
            Picture1.PSet (X0 + 19, Y), Color
        Next Y
        For Y = Y0 + 10 To Y0 + 14              ' 0
            Picture1.PSet (X0 + 21, Y), Color
        Next Y
            Picture1.PSet (X0 + 22, Y0 + 10), Color
```

```
        Picture1.PSet (X0 + 22, Y0 + 14), Color
        For Y = Y0 + 10 To Y0 + 14
            Picture1.PSet (X0 + 23, Y), Color
        Next Y
    End Sub Sub segDelete (status)

        Dim X, Y As Integer
        Dim Color As Long
        Const X0 = X0_DLT, Y0 = Y0_DLT If status = I_OFF Then
15          Color = WHITE
        Else Color = BLACK
        End If For X = X0 + 6 To X0 + 9                ' draw circle
20          Picture1.PSet (X, Y0 + 1), Color
        Next X
        Picture1.PSet (X0 + 10, Y0 + 2), Color
        Picture1.PSet (X0 + 11, Y0 + 2), Color
        Picture1.PSet (X0 + 12, Y0 + 3), Color
25      Picture1.PSet (X0 + 13, Y0 + 4), Color
        Picture1.PSet (X0 + 13, Y0 + 5), Color
        For Y = Y0 + 6 To Y0 + 9
        Picture1.PSet (X0 + 14, Y), Color
        Next Y
30      Picture1.PSet (X0 + 13, Y0 + 10), Color
        Picture1.PSet (X0 + 13, Y0 + 11), Color
        Picture1.PSet (X0 + 12, Y0 + 12), Color
        Picture1.PSet (X0 + 11, Y0 + 13), Color
        Picture1.PSet (X0 + 10, Y0 + 13), Color
35      For X = X0 + 6 To X0 + 9
            Picture1.PSet (X, Y0 + 14), Color
        Next X
        Picture1.PSet (X0 + 5, Y0 + 13), Color
```

```
         Picture1.PSet (X0 + 4, Y0 + 13), Color
         Picture1.PSet (X0 + 3, Y0 + 12), Color
         Picture1.PSet (X0 + 2, Y0 + 11), Color
         Picture1.PSet (X0 + 2, Y0 + 10), Color
  5      For Y = Y0 + 6 To Y0 + 9
            Picture1.PSet (X0 + 1, Y), Color
         Next Y
         Picture1.PSet (X0 + 2, Y0 + 5), Color
         Picture1.PSet (X0 + 2, Y0 + 4), Color
         Picture1.PSet (X0 + 3, Y0 + 3), Color
         Picture1.PSet (X0 + 4, Y0 + 2), Color
         Picture1.PSet (X0 + 5, Y0 + 2), Color     ' done with circle For X = X0 + 4 To X0 + 11                 ' draw "frame"
            Picture1.PSet (X, Y0 + 5), Color
         Next X
         For Y = Y0 + 6 To Y0 + 9
            Picture1.PSet (X0 + 11, Y), Color
         Next Y
         For X = X0 + 4 To X0 + 11
            Picture1.PSet (X, Y0 + 10), Color
         Next X
         For Y = Y0 + 6 To Y0 + 9
            Picture1.PSet (X0 + 4, Y), Color
         Next Y                                    ' done with "frame"

Picture1.PSet (X0 + 4, Y0 + 3), Color     ' draw slash
         For X = X0 + 3 To X0 + 5
            Picture1.PSet (X, Y0 + 4), Color
         Next X
         For X = X0 + 5 To X0 + 7
            Picture1.PSet (X, Y0 + 6), Color
         Next X
         For X = X0 + 6 To X0 + 8
            Picture1.PSet (X, Y0 + 7), Color
         Next X
         For X = X0 + 7 To X0 + 9
            Picture1.PSet (X, Y0 + 8), Color
```

```
        Next X
        For X = X0 + 8 To X0 + 10
            Picture1.PSet (X, Y0 + 9), Color
        Next X
        For X = X0 + 10 To X0 + 12
            Picture1.PSet (X, Y0 + 11), Color
        Next X
        Picture1.PSet (X0 + 11, Y0 + 12), Color    ' done with slash
    End Sub Sub segExpAuto (status)

Dim X, Y As Integer
        Dim Color As Long
        Const X0 = X0_EXP, Y0 = Y0_EXP If status = I_OFF Then
            Color = WHITE
        Else Color = BLACK
        End If Picture1.PSet (X0 + 34, Y0 + 8), Color
        Picture1.PSet (X0 + 33, Y0 + 9), Color
        Picture1.PSet (X0 + 35, Y0 + 9), Color
        Picture1.PSet (X0 + 32, Y0 + 10), Color
        Picture1.PSet (X0 + 36, Y0 + 10), Color
        For X = X0 + 31 To X0 + 37
            Picture1.PSet (X, Y0 + 11), Color
        Next X End Sub Sub segExpBar (status)
        Dim X, Y As Integer
        Dim Color As Long
        Const X0 = X0_EXP, Y0 = Y0_EXP
```

```
        If status = I_OFF Then
            Color = WHITE
        Else Color = BLACK
        End If Picture1.PSet (X0 + 6, Y0 + 2), Color
        For X = X0 + 31 To X0 + 37
            Picture1.PSet (X, Y0 + 2), Color
        Next X
        Picture1.PSet (X0 + 62, Y0 + 2), Color
        Picture1.PSet (X0 + 6, Y0 + 3), Color
        For X = X0 + 32 To X0 + 36
            Picture1.PSet (X, Y0 + 3), Color
        Next X
        Picture1.PSet (X0 + 62, Y0 + 3), Color
        Picture1.PSet (X0 + 6, Y0 + 4), Color
        Picture1.PSet (X0 + 20, Y0 + 4), Color
        For X = X0 + 33 To X0 + 35
            Picture1.PSet (X, Y0 + 4), Color
        Next X
        Picture1.PSet (X0 + 48, Y0 + 4), Color
        Picture1.PSet (X0 + 62, Y0 + 4), Color
        For X = X0 + 6 To X0 + 62 Step 14
            Picture1.PSet (X, Y0 + 5), Color
        Next X
        For X = X0 + 6 To X0 + 62
            Picture1.PSet (X, Y0 + 6), Color
        Next X
        For X = X0 + 6 To X0 + 62 Step 14
            Picture1.PSet (X, Y0 + 7), Color
        Next X For X = X0 + 9 To X0 + 11           ' minus sign
            Picture1.PSet (X, Y0 + 3), Color
        Next X
        Picture1.PSet (X0 + 58, Y0 + 2), Color  ' plus sign
        For X = X0 + 57 To X0 + 59
```

```
            Picture1.PSet (X, Y0 + 3), Color
        Next X
        Picture1.PSet (X0 + 58, Y0 + 4), Color
    End Sub Sub segExpPlus1 (status)

Dim X, Y As Integer
        Dim Color As Long
        Const X0 = X0_EXP, Y0 = Y0_EXP If status = I_OFF Then
            Color = WHITE
15      Else Color = BLACK
        End If Picture1.PSet (X0 + 34 + 14, Y0 + 8), Color
        Picture1.PSet (X0 + 33 + 14, Y0 + 9), Color
20      Picture1.PSet (X0 + 35 + 14, Y0 + 9), Color
        Picture1.PSet (X0 + 32 + 14, Y0 + 10), Color
        Picture1.PSet (X0 + 36 + 14, Y0 + 10), Color
        For X = X0 + 31 + 14 To X0 + 37 + 14
            Picture1.PSet (X, Y0 + 11), Color
        Next X End Sub Sub segExpPlus2 (status)
        Dim X, Y As Integer
        Dim Color As Long
        Const X0 = X0_EXP, Y0 = Y0_EXP 35      If status = I_OFF Then
            Color = WHITE
        Else Color = BLACK
        End If
```

```
        Picture1.PSet (X0 + 34 + 28, Y0 + 8), Color
        Picture1.PSet (X0 + 33 + 28, Y0 + 9), Color
        Picture1.PSet (X0 + 35 + 28, Y0 + 9), Color
        Picture1.PSet (X0 + 32 + 28, Y0 + 10), Color
5       Picture1.PSet (X0 + 36 + 28, Y0 + 10), Color
        For X = X0 + 31 + 28 To X0 + 37 + 28
            Picture1.PSet (X, Y0 + 11), Color
        Next X
    End Sub Sub segExpSub1 (status)

Dim X, Y As Integer
        Dim Color As Long
        Const X0 = X0_EXP, Y0 = Y0_EXP If status = I_OFF Then
            Color = WHITE
20      Else Color = BLACK
        End If Picture1.PSet (X0 + 34 - 14, Y0 + 8), Color
        Picture1.PSet (X0 + 33 - 14, Y0 + 9), Color
25      Picture1.PSet (X0 + 35 - 14, Y0 + 9), Color
        Picture1.PSet (X0 + 32 - 14, Y0 + 10), Color
        Picture1.PSet (X0 + 36 - 14, Y0 + 10), Color
        For X = X0 + 31 - 14 To X0 + 37 - 14
            Picture1.PSet (X, Y0 + 11), Color
        Next X End Sub Sub segExpSub2 (status)
        Dim X, Y As Integer
        Dim Color As Long
        Const X0 = X0_EXP, Y0 = Y0_EXP
```

```
            If status = I_OFF Then
                Color = WHITE
            Else Color = BLACK
 5      End If Picture1.PSet (X0 + 34 - 28, Y0 + 8), Color
        Picture1.PSet (X0 + 33 - 28, Y0 + 9), Color
        Picture1.PSet (X0 + 35 - 28, Y0 + 9), Color
10      Picture1.PSet (X0 + 32 - 28, Y0 + 10), Color
        Picture1.PSet (X0 + 36 - 28, Y0 + 10), Color
        For X = X0 + 31 - 28 To X0 + 37 - 28
            Picture1.PSet (X, Y0 + 11), Color
        Next X
15
    End Sub Sub segFlash (status)

20      Dim X, Y As Integer
        Dim Color As Long
        Const X0 = X0_FL, Y0 = Y0_FL If status = I_OFF Then
25          Color = WHITE
        Else Color = BLACK
        End If Picture1.PSet (X0 + 9, Y0 + 3), Color
        Picture1.PSet (X0 + 8, Y0 + 4), Color
        Picture1.PSet (X0 + 7, Y0 + 5), Color
        Picture1.PSet (X0 + 6, Y0 + 6), Color
        For X = X0 + 6 To X0 + Y0 + 9
            Picture1.PSet (X, Y0 + 7), Color
        Next X
        Picture1.PSet (X0 + 9, Y0 + 8), Color
        Picture1.PSet (X0 + 8, Y0 + 9), Color
        Picture1.PSet (X0 + 7, Y0 + 10), Color
```

```
        Picture1.PSet (X0 + 6, Y0 + 11), Color
        Picture1.PSet (X0 + 5, Y0 + 9), Color
        Picture1.PSet (X0 + 5, Y0 + 10), Color
        Picture1.PSet (X0 + 5, Y0 + 11), Color
        For X = X0 + 5 To X0 + 8
            Picture1.PSet (X, Y0 + 12), Color
        Next X End Sub
    Sub segFlashCirc (status)

Dim X, Y As Integer
        Dim Color As Long
15      Const X0 = X0_FL, Y0 = Y0_FL If status = I_OFF Then
            Color = WHITE
        Else Color = BLACK
20      End If For X = X0 + 6 To X0 + 9            ' draw circle
            Picture1.PSet (X, Y0 + 1), Color
        Next X
25      Picture1.PSet (X0 + 10, Y0 + 2), Color
        Picture1.PSet (X0 + 11, Y0 + 2), Color
        Picture1.PSet (X0 + 12, Y0 + 3), Color
        Picture1.PSet (X0 + 13, Y0 + 4), Color
        Picture1.PSet (X0 + 13, Y0 + 5), Color
30      For Y = Y0 + 6 To Y0 + 9
        Picture1.PSet (X0 + 14, Y), Color
        Next Y
        Picture1.PSet (X0 + 13, Y0 + 10), Color
        Picture1.PSet (X0 + 13, Y0 + 11), Color
35      Picture1.PSet (X0 + 12, Y0 + 12), Color
        Picture1.PSet (X0 + 11, Y0 + 13), Color
        Picture1.PSet (X0 + 10, Y0 + 13), Color
        For X = X0 + 6 To X0 + 9
```

```
        Picture1.PSet (X, Y0 + 14), Color
     Next X
     Picture1.PSet (X0 + 5, Y0 + 13), Color
     Picture1.PSet (X0 + 4, Y0 + 13), Color
5    Picture1.PSet (X0 + 3, Y0 + 12), Color
     Picture1.PSet (X0 + 2, Y0 + 11), Color
     Picture1.PSet (X0 + 2, Y0 + 10), Color
     For Y = Y0 + 6 To Y0 + 9
         Picture1.PSet (X0 + 1, Y), Color
10   Next Y
     Picture1.PSet (X0 + 2, Y0 + 5), Color
     Picture1.PSet (X0 + 2, Y0 + 4), Color
     Picture1.PSet (X0 + 3, Y0 + 3), Color
     Picture1.PSet (X0 + 4, Y0 + 2), Color
     Picture1.PSet (X0 + 5, Y0 + 2), Color       done with circle End Sub Sub segFlashSlash (status)
     Dim X, Y As Integer
     Dim Color As Long
     Const X0 = X0_FL, Y0 = Y0_FL 25   If status = I_OFF Then
         Color = WHITE
     Else Color = BLACK
     End If
     Picture1.PSet (X0 + 4, Y0 + 3), Color
     Picture1.PSet (X0 + 3, Y0 + 4), Color
     Picture1.PSet (X0 + 4, Y0 + 4), Color
     Picture1.PSet (X0 + 5, Y0 + 4), Color
     Picture1.PSet (X0 + 4, Y0 + 5), Color
     Picture1.PSet (X0 + 5, Y0 + 5), Color
     Picture1.PSet (X0 + 6, Y0 + 5), Color
     Picture1.PSet (X0 + 5, Y0 + 6), Color
     Picture1.PSet (X0 + 9, Y0 + 9), Color
```

```
          Picture1.PSet (X0 + 10, Y0 + 9), Color
          Picture1.PSet (X0 + 9, Y0 + 10), Color
          Picture1.PSet (X0 + 10, Y0 + 10), Color
          Picture1.PSet (X0 + 11, Y0 + 10), Color
          Picture1.PSet (X0 + 10, Y0 + 11), Color
          Picture1.PSet (X0 + 11, Y0 + 11), Color
          Picture1.PSet (X0 + 12, Y0 + 11), Color
          Picture1.PSet (X0 + 11, Y0 + 12), Color
      End Sub Sub segRoll (status)

'   Dim X, Y As Integer
      '   Dim Color As Long
      '   Const X0 = X0_ROL, Y0 = Y0_ROL
      '
      '   If status = I_OFF Then
      '       Color = WHITE
      '   Else Color = BLACK
      '   End If
      '
      '   For X = X0 + 2 To X0 + 5
      '       Picture1.PSet (X, Y0), Color
      '   Next X
      '   Picture1.PSet (X0 + 1, Y0 + 1), Color
      '   Picture1.PSet (X0 + 2, Y0 + 1), Color
      '   Picture1.PSet (X0 + 5, Y0 + 1), Color
      '   Picture1.PSet (X0 + 6, Y0 + 1), Color
      '   Picture1.PSet (X0 + 0, Y0 + 2), Color
      '   Picture1.PSet (X0 + 1, Y0 + 2), Color
      '   Picture1.PSet (X0 + 6, Y0 + 2), Color
      '   Picture1.PSet (X0 + 7, Y0 + 2), Color
      '   Picture1.PSet (X0 + 0, Y0 + 3), Color
      '   Picture1.PSet (X0 + 3, Y0 + 3), Color
      '   Picture1.PSet (X0 + 4, Y0 + 3), Color
      '   Picture1.PSet (X0 + 7, Y0 + 3), Color
      '   Picture1.PSet (X0 + 0, Y0 + 4), Color
```

```
'       Picture1.PSet (X0 + 3, Y0 + 4), Color
'       Picture1.PSet (X0 + 4, Y0 + 4), Color
'       Picture1.PSet (X0 + 7, Y0 + 4), Color
'       Picture1.PSet (X0 + 0, Y0 + 5), Color
'       Picture1.PSet (X0 + 1, Y0 + 5), Color
'       Picture1.PSet (X0 + 6, Y0 + 5), Color
'       Picture1.PSet (X0 + 7, Y0 + 5), Color
'       Picture1.PSet (X0 + 1, Y0 + 6), Color
'       Picture1.PSet (X0 + 2, Y0 + 6), Color
'       For X = X0 + 5 To X0 + 9
'           Picture1.PSet (X, Y0 + 6), Color
'       Next X
'       For X = X0 + 2 To X0 + 9
'           Picture1.PSet (X, Y0 + 7), Color
'       Next X End Sub Sub segSelCamera (status)

Dim X, Y As Integer
        Dim Color As Long
        Const X0 = X0_CAM, Y0 = Y0_CAM If status = I_OFF Then
            Color = WHITE
        Else Color = BLACK
        End If For X = X0 To X0 + 15
            Picture1.PSet (X, Y0), Color
        Next X
        For Y = Y0 + 1 To Y0 + 14
            Picture1.PSet (X0, Y), Color
        Next Y
        For X = X0 To X0 + 15
            Picture1.PSet (X, Y0 + 15), Color
        Next X
```

```
        For Y = Y0 + 1 To Y0 + 14
            Picture1.PSet (X0 + 15, Y), Color
        Next Y
    End Sub Sub segSelCard (status)

Dim X, Y As Integer
10      Dim Color As Long
        Const X0 = X0_DS, Y0 = Y0_DS If status = I_OFF Then
            Color = WHITE
15      Else Color = BLACK
        End If For X = X0 To X0 + 15
            Picture1.PSet (X, Y0), Color
20      Next X
        For Y = Y0 + 1 To Y0 + 14
            Picture1.PSet (X0, Y), Color
        Next Y
        For X = X0 To X0 + 15
25          Picture1.PSet (X, Y0 + 15), Color
        Next X
        For Y = Y0 + 1 To Y0 + 14
            Picture1.PSet (X0 + 15, Y), Color
        Next Y
    End Sub Sub segSelDelay (status)

        Dim X, Y As Integer
        Dim Color As Long
        Const X0 = X0_DLY, Y0 = Y0_DLY
```

```
        If status = I_OFF Then
            Color = WHITE
        Else Color = BLACK
        End If
 5
        For X = X0 To X0 + 15
            Picture1.PSet (X, Y0), Color
        Next X
        For Y = Y0 + 1 To Y0 + 14
10          Picture1.PSet (X0, Y), Color
        Next Y
        For X = X0 To X0 + 15
            Picture1.PSet (X, Y0 + 15), Color
        Next X
15      For Y = Y0 + 1 To Y0 + 14
            Picture1.PSet (X0 + 15, Y), Color
        Next Y End Sub
    Sub segSelDelete (status)

Dim X, Y As Integer
        Dim Color As Long
25      Const X0 = X0_DLT, Y0 = Y0_DLT If status = I_OFF Then
            Color = WHITE
        Else Color = BLACK
30      End If For X = X0 To X0 + 15
            Picture1.PSet (X, Y0), Color
        Next X
35      For Y = Y0 + 1 To Y0 + 14
            Picture1.PSet (X0, Y), Color
        Next Y
        For X = X0 To X0 + 15
```

```
                Picture1.PSet (X, Y0 + 15), Color
        Next X
        For Y = Y0 + 1 To Y0 + 14
            Picture1.PSet (X0 + 15, Y), Color
        Next Y End Sub Sub segSelExp (status)
        Dim X, Y As Integer
        Dim Color As Long
        Const X0 = X0_EXP, Y0 = Y0_EXP 15      If status = I_OFF Then
            Color = WHITE
        Else Color = BLACK
        End If
        For X = X0 To X0 + 68
                Picture1.PSet (X, Y0), Color
        Next X
        For Y = Y0 + 1 To Y0 + 12
            Picture1.PSet (X0, Y), Color
        Next Y
        For X = X0 To X0 + 68
                Picture1.PSet (X, Y0 + 13), Color
        Next X
        For Y = Y0 + 1 To Y0 + 12
            Picture1.PSet (X0 + 68, Y), Color
        Next Y End Sub
    Sub segSelFlash (status)

Dim X, Y As Integer
        Dim Color As Long
```

```
      Const X0 = X0_FL, Y0 = Y0_FL

If status = I_OFF Then
          Color = WHITE
 5    Else Color = BLACK
      End If For X = X0 To X0 + 15
          Picture1.PSet (X, Y0), Color
10    Next X
      For Y = Y0 + 1 To Y0 + 14
          Picture1.PSet (X0, Y), Color
      Next Y
      For X = X0 To X0 + 15
15        Picture1.PSet (X, Y0 + 15), Color
      Next X
      For Y = Y0 + 1 To Y0 + 14
          Picture1.PSet (X0 + 15, Y), Color
      Next Y
   End Sub Sub segToCard (status)

      Dim X, Y As Integer
      Dim Color As Long
      Const X0 = X0_DS, Y0 = Y0_DS If status = I_OFF Then
30        Color = WHITE
      Else Color = BLACK
      End If For X = X0 + 7 To X0 + 13             ' draw card
          Picture1.PSet (X, Y0 + 2), Color
      Next X
      For X = X0 + 6 To X0 + 14
          Picture1.PSet (X, Y0 + 3), Color
```

```
    Next X
    Picture1.PSet (X0 + 6, Y0 + 4), Color
    Picture1.PSet (X0 + 7, Y0 + 4), Color
    Picture1.PSet (X0 + 13, Y0 + 4), Color
    Picture1.PSet (X0 + 14, Y0 + 4), Color
    For X = X0 + 6 To X0 + 14
            Picture1.PSet (X, Y0 + 5), Color
    Next X
    Picture1.PSet (X0 + 6, Y0 + 6), Color
    Picture1.PSet (X0 + 7, Y0 + 6), Color
    Picture1.PSet (X0 + 13, Y0 + 6), Color
    Picture1.PSet (X0 + 14, Y0 + 6), Color
    For X = X0 + 6 To X0 + 14
            Picture1.PSet (X, Y0 + 7), Color
    Next X
    For X = X0 + 6 To X0 + 9
            Picture1.PSet (X, Y0 + 8), Color
    Next X
    For X = X0 + 11 To X0 + 14
            Picture1.PSet (X, Y0 + 8), Color
    Next X
    For X = X0 + 6 To X0 + 9
            Picture1.PSet (X, Y0 + 9), Color
    Next X
    For X = X0 + 11 To X0 + 14
            Picture1.PSet (X, Y0 + 9), Color
    Next X
    For X = X0 + 6 To X0 + 7
            Picture1.PSet (X, Y0 + 10), Color
    Next X
    For X = X0 + 13 To X0 + 14
            Picture1.PSet (X, Y0 + 10), Color
    Next X
    For X = X0 + 6 To X0 + 8
            Picture1.PSet (X, Y0 + 11), Color
    Next X
    For X = X0 + 12 To X0 + 14
            Picture1.PSet (X, Y0 + 11), Color
```

```
        Next X
        For X = X0 + 6 To X0 + 9
            Picture1.PSet (X, Y0 + 12), Color
        Next X
        For X = X0 + 11 To X0 + 14
            Picture1.PSet (X, Y0 + 12), Color
        Next X
        For X = X0 + 7 To X0 + 13
            Picture1.PSet (X, Y0 + 13), Color
        Next X Picture1.PSet (X0 + 3, Y0 + 5), Color      ' draw arrow
        For X = X0 + 3 To X0 + 4
            Picture1.PSet (X, Y0 + 6), Color
        Next X
        For X = X0 + 1 To X0 + 5
            Picture1.PSet (X, Y0 + 7), Color
        Next X
        For X = X0 + 1 To X0 + 5
            Picture1.PSet (X, Y0 + 8), Color
        Next X
        For X = X0 + 3 To X0 + 4
            Picture1.PSet (X, Y0 + 9), Color
        Next X
        Picture1.PSet (X0 + 3, Y0 + 10), Color End Sub Sub segWarn (status)
        Dim X, Y As Integer
        Dim Color As Long
        Const X0 = X0_EXC, Y0 = Y0_EXC
        If status = I_OFF Then
            Color = WHITE
        Else Color = BLACK
        End If
```

```
        Picture1.PSet (X0 + 6, Y0), Color
        Picture1.PSet (X0 + 7, Y0), Color
        Picture1.PSet (X0 + 5, Y0 + 1), Color
        Picture1.PSet (X0 + 8, Y0 + 1), Color
        Picture1.PSet (X0 + 5, Y0 + 2), Color
        Picture1.PSet (X0 + 8, Y0 + 2), Color
        Picture1.PSet (X0 + 4, Y0 + 3), Color
        Picture1.PSet (X0 + 6, Y0 + 3), Color
        Picture1.PSet (X0 + 7, Y0 + 3), Color
        Picture1.PSet (X0 + 9, Y0 + 3), Color
        Picture1.PSet (X0 + 4, Y0 + 4), Color
        Picture1.PSet (X0 + 6, Y0 + 4), Color
        Picture1.PSet (X0 + 7, Y0 + 4), Color
        Picture1.PSet (X0 + 9, Y0 + 4), Color
        Picture1.PSet (X0 + 3, Y0 + 5), Color
        Picture1.PSet (X0 + 6, Y0 + 5), Color
        Picture1.PSet (X0 + 7, Y0 + 5), Color
        Picture1.PSet (X0 + 10, Y0 + 5), Color
        Picture1.PSet (X0 + 3, Y0 + 6), Color
        Picture1.PSet (X0 + 6, Y0 + 6), Color
        Picture1.PSet (X0 + 7, Y0 + 6), Color
        Picture1.PSet (X0 + 10, Y0 + 6), Color
        Picture1.PSet (X0 + 2, Y0 + 7), Color
        Picture1.PSet (X0 + 6, Y0 + 7), Color
        Picture1.PSet (X0 + 7, Y0 + 7), Color
        Picture1.PSet (X0 + 11, Y0 + 7), Color
        Picture1.PSet (X0 + 2, Y0 + 8), Color
        Picture1.PSet (X0 + 6, Y0 + 8), Color
        Picture1.PSet (X0 + 7, Y0 + 8), Color
        Picture1.PSet (X0 + 11, Y0 + 8), Color
        Picture1.PSet (X0 + 1, Y0 + 9), Color
        Picture1.PSet (X0 + 12, Y0 + 9), Color
        Picture1.PSet (X0 + 1, Y0 + 10), Color
        Picture1.PSet (X0 + 6, Y0 + 10), Color
        Picture1.PSet (X0 + 7, Y0 + 10), Color
        Picture1.PSet (X0 + 12, Y0 + 10), Color
        Picture1.PSet (X0, Y0 + 11), Color
        Picture1.PSet (X0 + 6, Y0 + 11), Color
```

```
        Picture1.PSet (X0 + 7, Y0 + 11), Color
        Picture1.PSet (X0 + 13, Y0 + 11), Color
        For X = X0 To X0 + 13
            Picture1.PSet (X, Y0 + 12), Color
        Next X '   Picture1.PSet (X0 + 5, Y0), Color
    '   Picture1.PSet (X0 + 4, Y0 + 1), Color
    '   Picture1.PSet (X0 + 6, Y0 + 1), Color
    '   Picture1.PSet (X0 + 3, Y0 + 2), Color
    '   Picture1.PSet (X0 + 5, Y0 + 2), Color
    '   Picture1.PSet (X0 + 7, Y0 + 2), Color
    '   Picture1.PSet (X0 + 2, Y0 + 3), Color
    '   Picture1.PSet (X0 + 5, Y0 + 3), Color
    '   Picture1.PSet (X0 + 8, Y0 + 3), Color
    '   Picture1.PSet (X0 + 2, Y0 + 4), Color
    '   Picture1.PSet (X0 + 5, Y0 + 4), Color
    '   Picture1.PSet (X0 + 8, Y0 + 4), Color
    '   Picture1.PSet (X0 + 1, Y0 + 5), Color
    '   Picture1.PSet (X0 + 5, Y0 + 5), Color
    '   Picture1.PSet (X0 + 9, Y0 + 5), Color
    '   Picture1.PSet (X0 + 1, Y0 + 6), Color
    '   Picture1.PSet (X0 + 9, Y0 + 6), Color
    '   Picture1.PSet (X0, Y0 + 7), Color
    '   Picture1.PSet (X0 + 5, Y0 + 7), Color
    '   Picture1.PSet (X0 + 10, Y0 + 7), Color
    '
    '   For X = X0 To X0 + 10
    '       Picture1.PSet (X, Y0 + 8), Color
    '   Next X End Sub Sub showNumber (n)
    ' Number is in range -1..100, else ERROR (if -1, clear both
    number segs)
        Select Case n
        Case -1         ' clear number area
```

```
            showTens (-1)
            showUnits (-1)
        Case 0 To 9    ' clear tens digit, do units
            showTens (-1)
            showUnits (n)
        Case 10 To 99  ' do tens, then do units
            showTens (n \ 10)
            showUnits (n Mod 10)
        Case 100
            showTens (0)
            showUnits (0)
        Case Else      ' show error (3 horiz. bars)
            showTens (-1)
            showUnits (10)
        End Select
    End Sub Sub showTens (n)
    ' Number is in range -1..9, else ERROR (if -1, clear number
    seg)
        Select Case n
        Case -1             ' clear
            seg10A (I_OFF): seg10B (I_OFF): seg10C (I_OFF): seg10D
    (I_OFF): seg10E (I_OFF): seg10F (I_OFF): seg10G (I_OFF)
        Case 0
            seg10D (I_OFF)
            seg10A (I_ON): seg10B (I_ON): seg10C (I_ON): seg10E
    (I_ON):
    seg10F (I_ON): seg10G (I_ON)
        Case 1
            seg10A (I_OFF): seg10B (I_OFF): seg10D (I_OFF): seg10E
    (I_OFF): seg10G (I_OFF)
            seg10C (I_ON): seg10F (I_ON)
        Case 2
            seg10B (I_OFF): seg10F (I_OFF)
            seg10A (I_ON): seg10C (I_ON): seg10D (I_ON): seg10E
    (I_ON):
    seg10G (I_ON)
```

```
        Case 3
            seg10B (I_OFF): seg10E (I_OFF)
            seg10A (I_ON): seg10C (I_ON): seg10D (I_ON): seg10F
    (I_ON):
    seg10G (I_ON)
        Case 4
            seg10A (I_OFF): seg10E (I_OFF): seg10G (I_OFF)
            seg10B (I_ON): seg10C (I_ON): seg10D (I_ON): seg10F
    (I_ON)
        Case 5
            seg10C (I_OFF): seg10E (I_OFF)
            seg10A (I_ON): seg10B (I_ON): seg10D (I_ON): seg10F
    (I_ON):
    seg10G (I_ON)
        Case 6
            seg10C (I_OFF)
            seg10A (I_ON): seg10B (I_ON): seg10D (I_ON): seg10E
    (I_ON):
    seg10F (I_ON): seg10G (I_ON)
        Case 7
            seg10B (I_OFF): seg10D (I_OFF): seg10E (I_OFF): seg10G
    (I_OFF)
            seg10A (I_ON): seg10C (I_ON): seg10F (I_ON)
        Case 8
            seg10A (I_ON): seg10B (I_ON): seg10C (I_ON): seg10D
    (I_ON):
    seg10E (I_ON): seg10F (I_ON): seg10G (I_ON)
        Case 9
            seg10E (I_OFF)
            seg10A (I_ON): seg10B (I_ON): seg10C (I_ON): seg10D
    (I_ON):
    seg10F (I_ON): seg10G (I_ON)
        Case Else           ' error
            seg10B (I_OFF): seg10C (I_OFF): seg10E (I_OFF): seg10F
    (I_OFF)
            seg10A (I_ON): seg10D (I_ON): seg10G (I_ON)
        End Select
    End Sub
```

```
    Sub showUnits (n)
    ' Number is in range -1..9, else ERROR (if -1, clear number
    seg)
        Select Case n
        Case -1              ' clear
            seg01A (I_OFF): seg01B (I_OFF): seg01C (I_OFF): seg01D
    (I_OFF): seg01E (I_OFF): seg01F (I_OFF): seg01G (I_OFF)
        Case 0
            seg01D (I_OFF)
            seg01A (I_ON): seg01B (I_ON): seg01C (I_ON): seg01E
    (I_ON):
    seg01F (I_ON): seg01G (I_ON)
        Case 1
            seg01A (I_OFF): seg01B (I_OFF): seg01D (I_OFF): seg01E
    (I_OFF): seg01G (I_OFF)
            seg01C (I_ON): seg01F (I_ON)
        Case 2
            seg01B (I_OFF): seg01F (I_OFF)
            seg01A (I_ON): seg01C (I_ON): seg01D (I_ON): seg01E
    (I_ON):
    seg01G (I_ON)
        Case 3
            seg01B (I_OFF): seg01E (I_OFF)
            seg01A (I_ON): seg01C (I_ON): seg01D (I_ON): seg01F
    (I_ON):
    seg01G (I_ON)
        Case 4
            seg01A (I_OFF): seg01E (I_OFF): seg01G (I_OFF)
            seg01B (I_ON): seg01C (I_ON): seg01D (I_ON): seg01F
    (I_ON)
        Case 5
            seg01C (I_OFF): seg01E (I_OFF)
            seg01A (I_ON): seg01B (I_ON): seg01D (I_ON): seg01F
    (I_ON):
    seg01G (I_ON)
        Case 6
            seg01C (I_OFF)
```

```
            seg01A (I_ON): seg01B (I_ON): seg01D (I_ON): seg01E
    (I_ON):
    seg01F (I_ON): seg01G (I_ON)
        Case 7
            seg01B (I_OFF): seg01D (I_OFF): seg01E (I_OFF): seg01G
    (I_OFF)
            seg01A (I_ON): seg01C (I_ON): seg01F (I_ON)
        Case 8
            seg01A (I_ON): seg01B (I_ON): seg01C (I_ON): seg01D
    (I_ON):
    seg01E (I_ON): seg01F (I_ON): seg01G (I_ON)
        Case 9
            seg01E (I_OFF)
            seg01A (I_ON): seg01B (I_ON): seg01C (I_ON): seg01D
    (I_ON):
    seg01F (I_ON): seg01G (I_ON)
        Case Else      ' error
            seg01B (I_OFF): seg01C (I_OFF): seg01E (I_OFF): seg01F
    (I_OFF)
            seg01A (I_ON): seg01D (I_ON): seg01G (I_ON)
        End Select
    End Sub Sub ShutterBut_Click ()
        ShutterButton = 1
        TimeoutSecs = 0
        segRoll (I_ON)
        showNumber (MAXPHOTOS - NumPhotos)
        If MenuLevel <> 0 Then
            segWarn (I_OFF)
            MenuLevel = 0
        End If
    End Sub Sub wait (t)
    Dim i, j As Integer
```

```
        Tick = False
        For i = 0 To t
            For j = 0 To 32000
                If Tick Then Exit For
            Next j
            Tick = False
        Next i End Sub
    Sub wait1 ()
    Dim j As Integer Tick = False
        For j = 0 To 32000
            If Tick Then Exit For
        Next j End Sub
    Sub waitBlink (seg)
    Dim i, s As Integer CmdButton = 0
        ShutterButton = 0

For i = 0 To NBlinks
            If i Mod 2 = 0 Then
                s = I_OFF
            Else
                s = I_ON
            End If ' even
            Select Case seg
            Case S_FLASH
                segFlash (s)
            Case S_DELAY
                segDelay (s)
            Case S_BATT
```

It will be understood that the foregoing is merely illustrative of the principles of the invention, and that various modifications can be made by those skilled in the art without departing from the scope and spirit of the invention. Accordingly, the foregoing disclosure is intended to be illustrative, but not limiting, of the scope of the invention which is set forth in the following claims.

What is claimed is:

1. A hand-held digital camera comprising:

a CCD for receiving an image and converting said image to a digital file of image data;

a memory for storing said image data;

a communication port for communicating between said hand-held digital camera and a digital computer; and a user interface, said user interface comprising:

a LCD comprising a plurality of selectable function icons representing a plurality of selectable functions, at least one of said selectable function icons having a plurality of selectable options icons adjacent thereto;

selecting means consisting of:

a first switch for cycling among said selectable function icons to choose a selected function; and a second switch for cycling among said selectable options of said selected function; wherein said first and second switch control all selectable functions on said LCD.

2. The hand-held digital camera of claim 1 further comprising:

an orifice having first screw threads for receiving a first detachable lens assembly, said first detachable lens assembly having second screw threads defining a 37 mm screw for mating with said first screw threads.

3. The hand-held digital camera of claim 1 further comprising:

means coupled to said communication port and responsive to a command from said digital computer for disabling a first one of said selectable functions thereby preventing its selection by a user.

4. The hand-held digital camera of claim 1 further comprising:

means coupled to said communication port and responsive to a command from said digital computer for setting the power-up defaults of certain ones of said selectable functions.

5. The hand-held digital camera of claim 4 wherein said one of said selectable functions is one of exposure offset, shutter delay, or flash functions.

6. The hand-held digital camera of claim 1 further comprising:

means coupled to said communication port and responsive to a command from said digital computer for permitting said hand-held digital camera to select one of said selectable functions and one of said selectable options without requiring a user to operate said switches.

7. The digital camera of claim 1 wherein said second switch cycles in a first direction among said selectable options, and further comprising:

a third switch for cycling in a second direction among said selectable options; and a single rocker button for activating said second and third switches.

8. The digital camera of claim 1 wherein at least one of said selectable functions is an option-less function that does not have a plurality of selectable options, and instead, when selected by said first switch, is activated by said second switch.

9. The digital camera of claim 8 wherein said option-less function deletes a last image, and is represented by a function icon in the shape of a film negative with an X.

10. The digital camera of claim 8 wherein said option-less function deletes all images, having a function icon in the shape of a plurality of film negatives with an X.

11. The digital camera of claim 1 wherein said LCD further comprises a plurality of non-user-selectable status icons.

12. The digital camera of claim 11 wherein one of said non-user-selectable status icons comprises two variable single digit number displays adjacent a non-variable 1 icon and a non-variable 2 icon, said displays and non-variable icons indicating numbers from 0 to 299.

13. The digital camera of claim 11 wherein one of said non-user-selectable status icons is in the shape of an hourglass to indicate a camera not ready state.

14. The digital camera of claim 11 wherein one of said non-user-selectable status icons is in the shape of an exclamation point to indicate a problem.

15. The digital camera of claim 11 wherein one of said non-user-selectable status icons is in the shape of an F to indicate that the camera is full and can take no more pictures.

16. The digital camera of claim 11 wherein one of said non-user-selectable status icons indicates a number of remaining pictures, and further comprising means for switching between a display of a number of pictures taken and a number of pictures remaining.

17. The digital camera of claim 1 further comprising:

a plurality of non-user-selectable function icons on said LCD;

means for storing in said memory status information regarding functions represented by said selectable function icons and said plurality of non-user-selectable function icons;

means, coupled to said communication port, for sending said status information to said digital computer responsive to a signal on said communication port.

18. The digital camera of claim 1 further comprising:

means for placing said camera in an off mode wherein it is unresponsive to said user interface; and means for communicating over said communication port while said camera is in said off mode.

19. The digital camera of claim 1 further comprising:

a non-user-selectable status icon indicating a battery level;

an external power supply connection; and means for deactivating the battery level icon when power is provided through said external power supply connection.

20. A hand-held digital camera comprising:

a CCD for receiving an image and converting said image to a digital file of image data;

a memory for storing said image data;

a communication port for communicating between said hand-held digital camera and a digital computer; and a user interface, said user interface comprising:

a LCD comprising a plurality of selectable function icons representing a plurality of selectable functions, at least one of said selectable function icons having a plurality of selectable option icons adjacent thereto;

selecting means consisting of:
- a first switch for cycling among said selectable function icons to choose a selected function; and
- a second switch for cycling among said selectable options of said selected function;
- wherein said first and second switch control all selectable functions on said LCD;
- wherein one of said selectable function icons indicates a flash;
- a first selectable option icon in the shape of a check representing flash on; and
- a second selectable option icon in the shape of an X representing flash off.

21. A hand-held digital camera comprising:
- a CCD for receiving an image and converting said image to a digital file of image data;
- a memory for storing said image data;
- a communication port for communicating between said hand-held digital camera and a digital computer; and
- a user interface, said user interface comprising:
  - a LCD comprising a plurality of selectable function icons representing a plurality of selectable functions, at least one of said selectable function icons having a plurality of selectable option icons adjacent thereto;
  - selecting means consisting of:
    - a first switch for cycling among said selectable function icons to choose a selected function; and
    - a second switch for cycling among said selectable options of said selected function;
    - wherein said first and second switch control all selectable functions on said LCD;
    - wherein one of said selectable function icons indicates a shutter activation delay;
- a first selectable option icon in the shape of an encircled 10 representing a 10 second delay; and
- a second selectable option icon in the shape of an encircled 20 representing a 20 second delay.

22. A hand-held digital camera comprising:
- a CCD for receiving an image and converting said image to a digital file of image data;
- a memory for storing said image data;
- a communication port for communicating between said hand-held digital camera and a digital computer; and
- a user interface, said user interface comprising:
  - a LCD comprising a plurality of selectable function icons representing a plurality of selectable functions, at least one of said selectable function icons having plurality of selectable option icons adjacent thereto;
  - selecting means consisting of:
    - a first switch for cycling among said selectable function icons to choose a selected function; and
    - a second switch for cycling among said selectable options of said selected function;
    - wherein said first and second switch control all selectable functions on said LCD;
    - wherein one of said selectable icons indicates an exposure offset;
- a plurality of selectable option icons along a scale bar.

23. A hand-held digital camera comprising:
- a circuit for receiving an image and converting said image to a digital file of image data;
- a memory for storing said image data;
- a communication port for communicating between said hand-held digital camera and a digital computer, said communication port providing either image data or control information over the same signal lines;
- a user interface, said user interface comprising:
  - a display comprising a plurality of selectable function icons representing a plurality of selectable function, at least one of said selectable function icons having a plurality of selectable option icons adjacent thereto;
  - a first switch for selecting one of said plurality of selectable function icons;
  - a second switch for selecting one of said selectable options;
  - one of said selectable function icons indicating a flash, with a first selectable option icon representing flash on adjacent thereto and a second selectable option icon rerpresnting flash off adjacent thereto;
  - one of said selectable function icons indicating a shutter activation delay, with a first selectable option icon representing a first delay and a second selectable option icon representing a second delay adjacent thereto;
  - one of said selectable function icons indicating an exposure offset, with a plurality of selectable option icons along a scale bar adjacent thereto;
  - a shutter activated switch for activating said user interface;
- means for placing said camera in an off mode wherein it is unresponsive to said uses interface; and
- means for communicating over said communication port while said camera is in said off mode.

24. The hand-held digital camera of claim 1 wherein said second switch is for cycling in a first direction among said selectable options and further comprising a third switch for cycling in a second direction among said selectable options.

* * * * *